(12) United States Patent
Takahashi et al.

(10) Patent No.: US 9,969,384 B2
(45) Date of Patent: May 15, 2018

(54) VEHICLE CONTROL SYSTEM

(71) Applicant: HITACHI AUTOMOTIVE SYSTEMS, LTD., Hitachinaka-shi, Ibaraki (JP)

(72) Inventors: Akira Takahashi, Sagamihara (JP); Jun Kubo, Hino (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 68 days.

(21) Appl. No.: 14/896,747

(22) PCT Filed: Jun. 3, 2014

(86) PCT No.: PCT/JP2014/064676
§ 371 (c)(1),
(2) Date: Dec. 8, 2015

(87) PCT Pub. No.: WO2014/199868
PCT Pub. Date: Dec. 18, 2014

(65) Prior Publication Data
US 2016/0137195 A1 May 19, 2016

(30) Foreign Application Priority Data
Jun. 14, 2013 (JP) .................. 2013-126114

(51) Int. Cl.
*B60W 30/02* (2012.01)
*B60W 10/18* (2012.01)
(Continued)

(52) U.S. Cl.
CPC .......... *B60W 30/02* (2013.01); *B60T 8/1755* (2013.01); *B60T 8/17552* (2013.01);
(Continued)

(58) Field of Classification Search
CPC ...... B60W 30/02; B60W 10/18; B60W 10/20; B60W 30/045; B60W 30/10;
(Continued)

(56) References Cited

U.S. PATENT DOCUMENTS

2003/0218564 A1* 11/2003 Tamatsu ................. G01S 7/414
342/70
2005/0125131 A1* 6/2005 Kato ....................... B60T 8/172
701/70
(Continued)

FOREIGN PATENT DOCUMENTS

JP   H10-100738 A   4/1998
JP   H11-078948 A   3/1999
(Continued)

Primary Examiner — Jerrah Edwards
Assistant Examiner — Mathew Franklin Gordon
(74) Attorney, Agent, or Firm — Foley & Lardner LLP

(57) ABSTRACT

There is provided a vehicle control system capable of ensuring stability even if an ego vehicle spins slowly. The invention computes a relative slip angle between a leading vehicle and the ego vehicle on the basis of distance between the ego vehicle and the leading vehicle and distance between a traveling-direction virtual line extending from the ego vehicle in a traveling direction and the leading vehicle, sets a spin judgment threshold value according to the relative slip angle, and controls yaw moment to reduce the relative slip angle when the relative slip angle exceeds the spin judgment threshold value.

17 Claims, 18 Drawing Sheets

(51) Int. Cl.
*B60W 10/20* (2006.01)
*B60W 40/114* (2012.01)
*B60T 8/1755* (2006.01)
*B62D 15/02* (2006.01)
*B60W 30/045* (2012.01)
*B60W 30/10* (2006.01)
*G08G 1/16* (2006.01)

(52) U.S. Cl.
CPC ............ *B60W 10/18* (2013.01); *B60W 10/20* (2013.01); *B60W 30/045* (2013.01); *B60W 30/10* (2013.01); *B60W 40/114* (2013.01); *B62D 15/025* (2013.01); *G08G 1/166* (2013.01); *B60T 2260/02* (2013.01); *B60W 2420/42* (2013.01); *B60W 2520/26* (2013.01); *B60W 2710/18* (2013.01); *B60W 2710/202* (2013.01); *G08G 1/16* (2013.01)

(58) Field of Classification Search
CPC .......... B60W 40/114; B60W 2420/42; B60W 2520/26; B60W 2710/18; B60T 8/1755; B60T 8/15772; B60T 2260/02; B62D 15/025; G08G 1/166; G08G 1/16; B60E 2710/202

See application file for complete search history.

(56) References Cited

U.S. PATENT DOCUMENTS

2006/0145827 A1* 7/2006 Kuge ................. B60K 31/0008
340/439
2011/0178689 A1* 7/2011 Yasui ....................... B60T 7/12
701/70

FOREIGN PATENT DOCUMENTS

| JP | 2003-344534 A | 12/2003 |
| JP | 2004-345460 A | 12/2004 |
| JP | 2005-178622 A | 7/2005 |
| JP | 2007-001579 A | 1/2007 |
| JP | 2010-076539 A | 4/2010 |
| JP | 2010-198513 A | 9/2010 |
| JP | 2011-191238 A | 9/2011 |

* cited by examiner

VEHICLE CONTROL SYSTEM

TECHNICAL FIELD

The invention relates to a vehicle control system configured to recognize a travel environment in which a vehicle travels, and provide drive assist.

BACKGROUND ART

Patent Document 1 discloses the technology of calculating a travel locus on the basis of a course recognized as a travel path, calculating a target yaw rate to make an ego vehicle travel along the calculated travel locus, and carrying out yaw rate control so that the actual yaw rate of the ego vehicle is equal to the target yaw rate, to thereby make the ego vehicle travel along the travel path.

CITATION LIST

Patent Document

Patent Document 1: Japanese Unexamined Patent Application Publication No. 2004-345460

SUMMARY OF INVENTION

Technical Problem

It has been difficult for the conventional technology, however, to ensure the stability of vehicle behavior because the vehicle is likely to spin if a hydroplane phenomenon or the like occurs during driving.

It is an object of the invention to provide a vehicle control system which is capable of ensuring the stability even if the vehicle spins slowly.

Solution to Problem

To accomplish the above object, the invention computes a relative slip angle between a leading vehicle and an ego vehicle on the basis of distance between the ego vehicle and the leading vehicle and distance between a traveling-direction virtual line extending from the ego vehicle in a traveling direction and the leading vehicle, sets a spin judgment threshold value on the basis of the relative slip angle, and controls yaw moment to reduce the relative slip angle when the relative slip angle exceeds the spin judgment threshold value.

DESCRIPTION OF EMBODIMENTS

Embodiment 1

Figure 1:
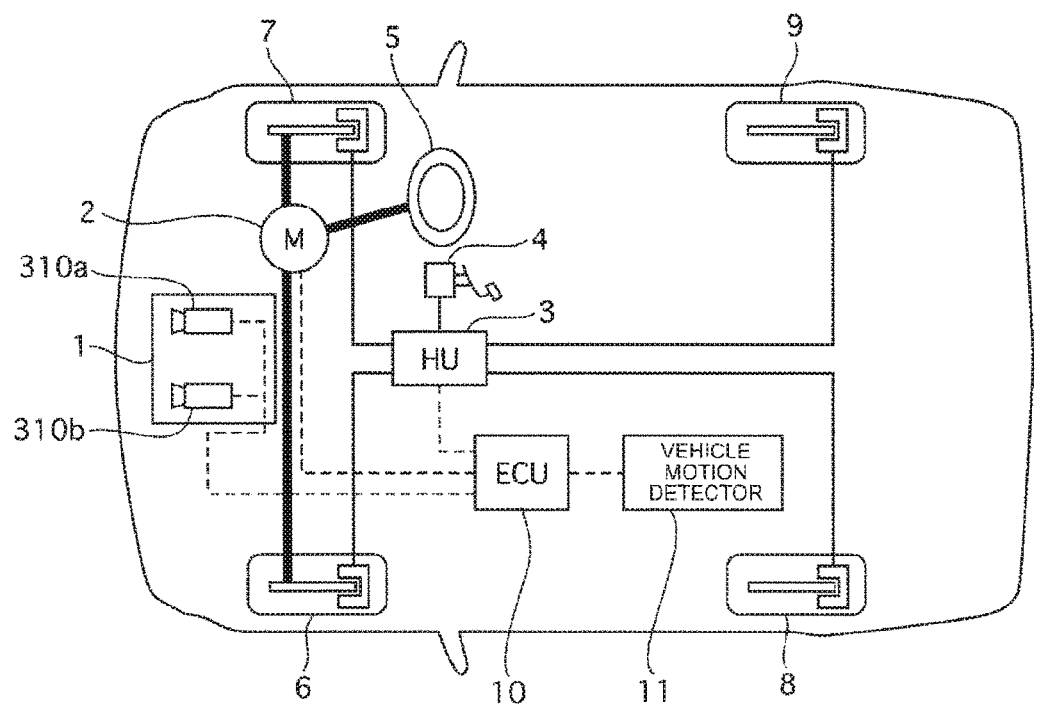
FIG. 1 is a schematic configuration view showing a vehicle control system of an Embodiment 1.

FIG. 1 is a schematic configuration view showing a vehicle control system of an Embodiment 1.

A vehicle of the Embodiment 1 includes a travel environment recognition system 1, an electrically-assisted power steering 2, a hydraulic brake unit 3, a brake booster 4, a steering wheel 5, a front left wheel 6, a front right wheel 7, a rear left wheel 8, a rear right wheel 9, an electronic control unit 10, and a vehicle motion detector 11.

The travel environment recognition system 1 takes an image of a view ahead of an ego vehicle by using stereo cameras 310a and 310b placed in a substantially middle position in the vicinity of a rearview mirror located in an upper front portion in an interior of the ego vehicle, and creates travel environment data.

The electrically-assisted power steering 2 calculates an assist torque on the basis of a command according to a driver steering torque and a steering angle or steering angle speed of the steering wheel 5, assists the steering torque by means of an electric motor, and turns the front right and left wheels 6 and 7. The electrically-assisted power steering 2 further executes steering-torque assist control which applies yaw moment to a vehicle through after-mentioned vehicle attitude stabilizing control. It is possible to employ a steer-by-wire system capable of turning the front right and left wheels 6 and 7 independently of a driver's steering wheel operation. There is no particular limitation.

The hydraulic brake unit 3 independently controls wheel-cylinder pressure which applies a braking torque to the four wheels according to a driver's brake operation force or a vehicle condition. The hydraulic brake unit 3 may be a VDC unit which carries out vehicle behavior control, such as vehicle dynamics control and vehicle stability control, which are existing controls. Alternatively, the hydraulic brake unit 3 may be a unique hydraulic unit. There is no particular limitation.

The brake booster 4 is a booster which boosts a driver's brake pedal force with respect to a piston in a master cylinder, which is activated by the brake pedal, and thus electrically assists a stroke force of the piston. Master-cylinder pressure is generated by the force boosted by the brake booster 4, and outputted to the hydraulic brake unit 3. The brake booster 4 does not have to be configured to electrically assist the force, and may be a negative-pressure booster using negative pressure of an engine. There is no particular limitation.

The vehicle motion detector 11 detects the speed of vehicle (vehicle speed), longitudinal acceleration, lateral acceleration, yaw rate, steering angle, steering torque, and the like.

The electronic control unit 10 controls the travel environment recognition system 1, the electrically-assisted power steering 2, and the hydraulic brake unit 3 in accordance with detection values of the vehicle motion detector 11. When a travel-path defining line which defines a travel path on a road recognized from an image taken by the travel environment recognition system 1 and a traveling direction of the ego vehicle (traveling-direction virtual line extending from the ego vehicle in the traveling direction, for example) intersect with each other, the electronic control unit 10 activates the electrically-assisted power steering 2 and/or the hydraulic brake unit 3, and applies the yaw moment and/or deceleration to the vehicle, to thereby carry out the vehicle attitude stabilizing control so that the traveling direction of the vehicle and a traffic lane are parallel to each other. The "travel-path defining line" here means a center line, a traffic lane line if white lines are recognized, a line connecting positions where guardrails are installed if guardrails are recognized, a line or the like indicating a boundary between a flat area and a slope area of a road embankment (hereinafter, also simply referred to as a "road edge"). The vehicle attitude stabilizing control will be later described in details.

If driven by the driver's brake operation force, the hydraulic brake unit 3 applies equal braking forces to the front right and left wheels 6 and 7 and to the rear right and left wheels 8 and 9. According to the vehicle attitude stabilizing control, right and left braking forces are generated while the braking forces are differentiated between the front right and left wheels 6 and 7 and between the rear right and left wheels 8 and 9, to thereby apply the yaw moment to the vehicle.

(Vehicle Attitude Stabilizing Control System)

Figure 2:
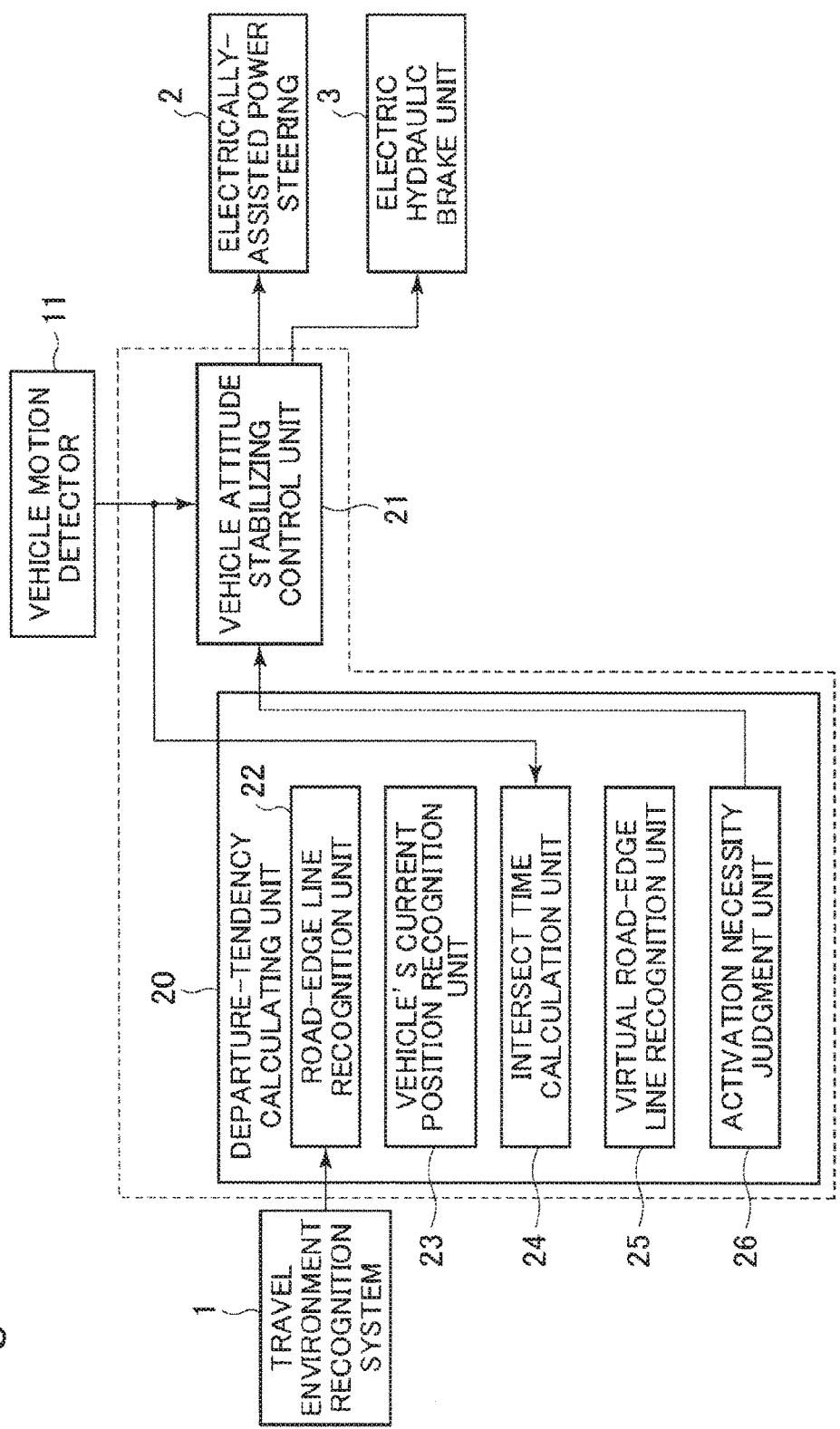
FIG. 2 is a control block diagram of an electronic control unit of the Embodiment 1.

FIG. 2 is a control block diagram of an electronic control unit 10 of the Embodiment 1. The electronic control unit 10 includes a departure-tendency calculating unit 20 and a vehicle attitude stabilizing control unit 21. The departure-tendency calculating unit 20 calculates a lane departure tendency of a vehicle. The vehicle attitude stabilizing control unit 21 activates the electrically-assisted power steering 2 and/or the hydraulic brake unit 3 when the departure-tendency calculating unit 20 detects the departure tendency of the vehicle from the driving lane. The vehicle attitude stabilizing control unit 21 thus applies a yaw moment and/or deceleration to the vehicle to suppress the departure tendency. The vehicle attitude stabilizing control unit 21 makes the ego vehicle parallel to the travel-path defining line in accordance with the traveling-direction virtual line extending from the ego vehicle in the traveling direction, an angle formed by the traveling-direction virtual line and a virtual travel-path defining line which is in a direction of tangent to the travel-path defining line, at a position where the traveling-direction virtual line and the travel-path defining line intersect (hereinafter, referred to as a "formed angle $\theta$". See FIGS. 14 and 15), and a turning condition of the ego vehicle.

The departure-tendency calculating unit 20 includes a travel-path defining line recognition unit (road-edge line recognition unit) 22, a vehicle's current position recognition unit 23, an intersect time calculation unit 24, a virtual travel-path defining line calculation unit (virtual road-edge line recognition unit) 25, and an activation necessity judgment unit 26.

The travel-path defining line recognition unit 22 recognizes boundary lines (including a center line) of road edges existing on right and left sides of a traffic lane on which the ego vehicle travels, which include white lines, guardrails and curbs, from an image of a view ahead of the ego vehicle, which is taken by the travel environment recognition system 1.

The vehicle's current position recognition unit 23 recognizes a current position of a vehicle, which is a forward end of the vehicle as viewed in a traveling direction of the ego vehicle, and also recognizes the traveling-direction virtual line from the vehicle's current position in the traveling direction of the ego vehicle. The current position of the vehicle may be a substantially central position of the ego vehicle, instead of the forward end of the vehicle as viewed in the traveling direction. If the ego-vehicle traveling direction (traveling-direction virtual line) intersects with a travel-path defining line on the right, a right forward position of the ego vehicle may be the current position of the vehicle. If the ego-vehicle traveling direction intersects with a travel-path defining line on the left, a left forward position of the ego vehicle may be the current position of the vehicle. The current position of the vehicle may also be set at a position located with leeway as compared to the position of the actual end of the vehicle. There is no particular limitation.

The intersect time calculation unit 24 computes an intersect time, namely, a time period in which the ego vehicle travels at current speed from the vehicle's current position to an intersection of the traveling-direction virtual line and the travel-path defining line.

The virtual travel-path defining line calculation unit 25 calculates the virtual travel-path defining line which is in the direction of tangent to the travel-path defining line at the intersection of the travel-path defining line and the traveling-direction virtual line. If there are a plurality of intersections of the travel-path defining line and the traveling-direction virtual line in the traveling direction of the ego vehicle, the virtual travel-path defining line calculation unit 25 calculates the virtual travel-path defining line which is in the direction of tangent at an intersection point closest to the ego vehicle.

The activation necessity judgment unit 26 makes a judgment on the basis of the intersect time as to whether the activation of the vehicle attitude stabilizing control is necessary, that is, whether control intervention by the vehicle attitude stabilizing control should be carried out. More specifically, a judgment is made as to whether the intersect time is equal to or longer than predetermined time. If the intersect time is equal to or longer than the predetermined time, it is judged that safety is secured, that there is no need for control intervention, and that the vehicle attitude stabilizing control is unnecessary. To the contrary, if the intersect time is shorter than the predetermined time, it is judged that the vehicle attitude stabilizing control is necessary.

If it is judged by the activation necessity judgment unit 26 that the vehicle attitude stabilizing control is necessary, the vehicle attitude stabilizing control unit 21 conducts the vehicle attitude stabilizing control. If judged unnecessary, the vehicle attitude stabilizing control is not conducted.

(Recognition of the Travel-Path Defining Line)

Figure 3:
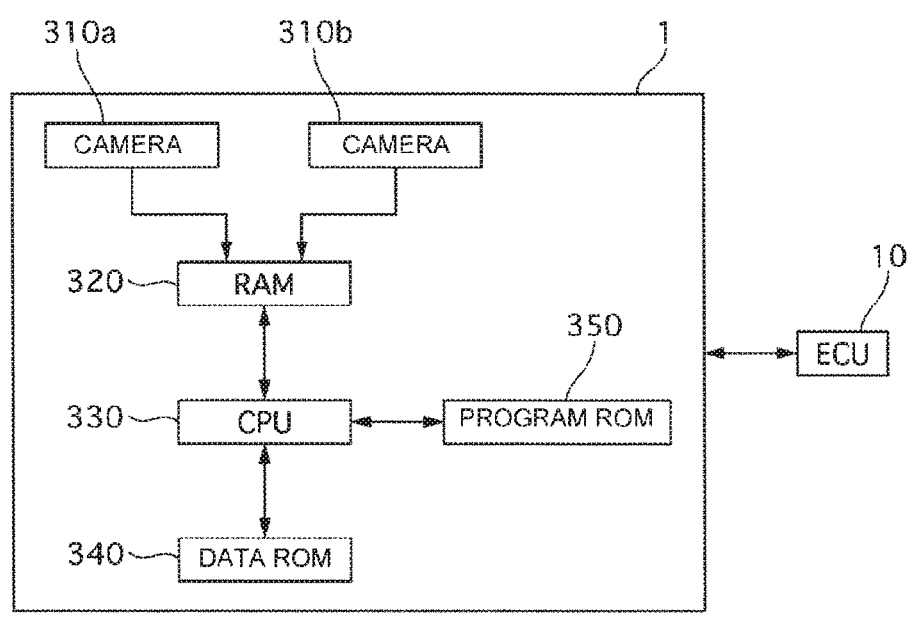
FIG. 3 is a block diagram showing a configuration of a travel environment recognition system of the Embodiment 1.

The recognition of the travel-path defining line will be explained in details. FIG. 3 is a block diagram showing a configuration of a travel environment recognition system of the Embodiment 1. The travel environment recognition system 1 is provided with a stereo camera 310 comprising a pair of cameras 310a and 310b as an image-taking device, and recognizes environment around a vehicle. According to the Embodiment 1, the cameras are installed at the same distance from the center of the vehicle in a vehicle-width direction. It is possible to install three or more cameras. The description of the Embodiment 1 refers to a configuration in which images taken by the cameras are processed in the travel environment recognition system 1. Image processing or the like may be executed by another controller.

The travel environment recognition system 1 is configured to obtain distance to an object captured in an image on the basis a triangulation principle using difference in vision (hereinafter, referred to as "disparity") which occurs when an image is taken by the plurality of cameras 310a and 310b. For example, a relational expression below is true, where Z denotes distance to the object; B denotes distance between the cameras; f denotes a focal length of the cameras; and δ is disparity.

$$Z=(B\times f)/\delta$$

The travel environment recognition system 1 includes a RAM 320 which stores images taken, a CPU 330 which executes computational processing, a data ROM 340 which stores data, and a program ROM 350 in which a recognition processing program is stored. The stereo camera 310 is fixed to a rearview mirror portion in a vehicle interior and configured to take the image of the view ahead of the ego vehicle at a predetermined depression angle at the fixed position. The image of the view ahead of the ego vehicle, which is taken by the stereo camera 310 (hereinafter, referred to as an "image taken") is scanned into the RAM 320. The CPU 330 executes the recognition processing program stored in the program ROM 350 with respect to the image taken which is scanned into the RAM 320, to thereby detect a traffic lane and a three dimensional object ahead of the ego vehicle, and estimate a road configuration. A result of the estimation by the CPU 330 (computation result) is outputted to the data ROM 340 and/or ECU 10.

Figure 4:
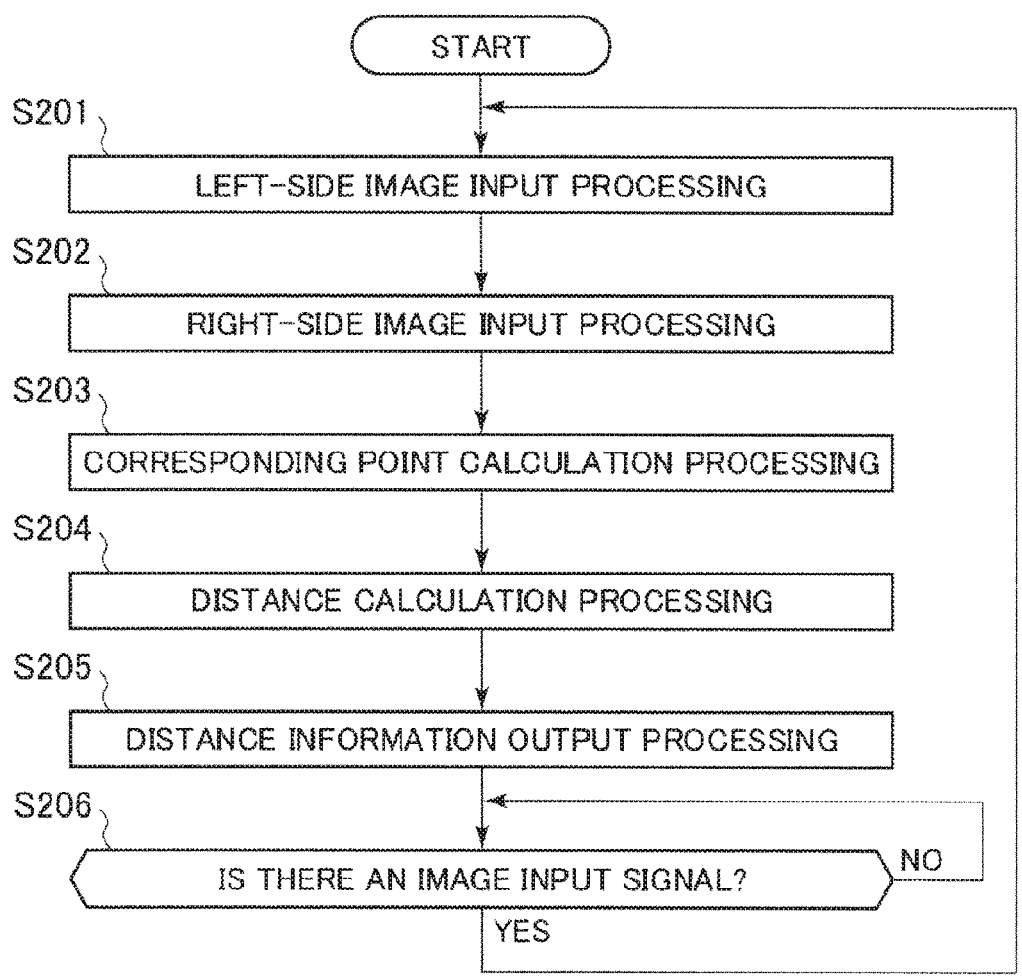
FIG. 4 is a flowchart showing image processing in the travel environment recognition system of the Embodiment 1.

FIG. 4 is a flowchart showing image processing in the travel environment recognition system of the Embodiment 1.

Step 201 executes processing of inputting images taken by the camera 310a situated on the left. Data of the images taken by the camera 310a are inputted into the RAM 320.

Step 202 executes processing of inputting images taken by the camera 310b situated on the right. Data of the images taken by the camera 310b are inputted into the RAM 320.

In Step 203, the CPU 330 executes processing of calculating corresponding points captured in the images.

In Step 204, the CPU 330 executes processing of calculating distance to the calculated corresponding points. The distance calculation processing is carried out on the basis of the relational expression, $Z=(B\times f)/\delta$. Step 205 executes processing of outputting distance information.

In Step 206, the CPU 330 makes a judgment as to presence of an image input signal. If there is the image input signal, the routine returns to Step 201 and repeats the present flow. If there is no image input signal, the routine terminates the computation processing and enters a wait state.

(Recognition Processing on a Road with a Steep Slope)

Figure 5:
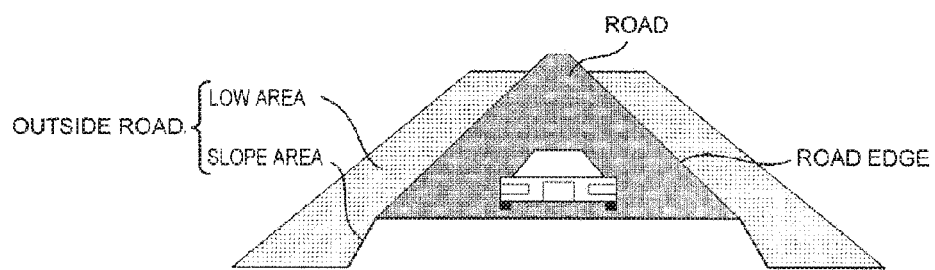
FIG. 5 is a diagrammatic illustration schematically showing a road embankment with steep slope areas.
Figure 6:
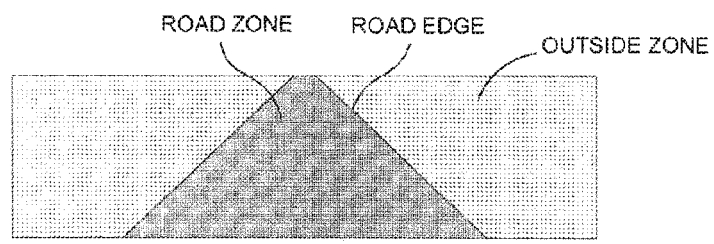
FIG. 6 is an image schematically showing a screen image of a road embankment with steep slope areas, which is taken from an ego vehicle.

The following description explains image processing in a case where outside zones located outside a road (such as both sides of the road on which the ego vehicle travels) are lower than a road surface. FIG. 5 is a diagrammatic illustration schematically showing a road embankment with steep slope areas. In this road embankment, a road is formed on an upper side portion of an embankment having a substantially trapezoidal cross-section. Between the road and the outside zone, a slope area is formed, and outside the slope area is a low area. Hereinafter, the road is also referred to as a "road surface". FIG. 6 is an image schematically showing a screen image of the road embankment with steep slope areas, which is taken from the ego vehicle. In this image taken, the road edge which is the travel-path defining line and the outside areas (zones lower than the road surface) are in abutment with each other in the image taken. In the case of this road, the slope has an angle larger than the depression angle of the stereo camera 310 (slope is steep), so that a dead zone (portion which is not captured in an image) is created, and the slope area is not captured on a screen. As the result, the road edge and the low areas are in abutment with each other in the image taken. To solve this, a road zone and another zone indicating the low area are detected on the screen, and among boundaries between these zones on the screen, a road side is extracted as an actual road edge, to thereby achieve detection reflecting an actual road environment.

(Improvement of Accuracy in Image Processing)

Figure 7:
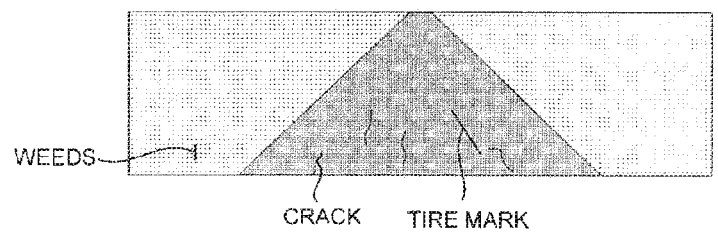
FIG. 7 is a diagrammatic illustration showing characteristic points captured in an image at the same time when the image of an actual road is taken.

If the road and the outside zones are visually completely homogenous, it is difficult to extract a certain place in the same zone in images taken by the two cameras. FIG. 7 is a diagrammatic illustration showing characteristic points captured in an image at the same time the image of an actual road is taken. As illustrated in FIG. 7, in many places on the actual road, there are visually characteristic points throughout the road including particles of asphalt concrete used to surface roads, road markings, joints and cracks in asphalt, tire marks left by traveling vehicles, and also tracks even in unsurfaced roads. In the zones lower than the road, visually characteristic points such as weeds are throughout the zone. In other words, there is a visual difference between the road surface provided with surfacing or land adjustment for the traveling of vehicles and the zones lower than the road surface, which are not provided with such treatment. A boundary portion between the road surface and the lower zone is highly likely to be visually noticeable.

Since there are many visually characteristic points on the road, the outside areas, and the boundaries therebetween, it is possible to make a comparison of these zones with one another within the images taken by the cameras 310a and 310b, calculate a direction and distance from the cameras 310a and 310b, and find a position of each characteristic point. This makes it possible to understand that an aggregate of the characteristic points on the road lies in substantially the same plane and that the characteristic points on the areas lower than the road are located on the outside zones.

(Overlay Processing)

Concerning a road surface configuration, a characteristic point on the screen, such as not only a road marking but a small crack and a tire mark on the road, is extracted from the images of the view ahead of the ego vehicle, which are taken by the stereo camera 310. On the basis of a position gap of the images taken by the two cameras on the screen, distance to the point is measured. On the other hand, characteristic points do not always evenly exist on the entire road surface. Even if they do exist, it is unsure whether the characteristic points can be detected all the time. Also in the zones lower than the road surface, the characteristic points are not necessarily detectable in every place of the zones. It is then required to further improve accuracy. To that end, the obtained distance data are accumulated in the data ROM 340 and overlaid on data obtained from the image taken with a subsequent or later timing.

Figure 8:
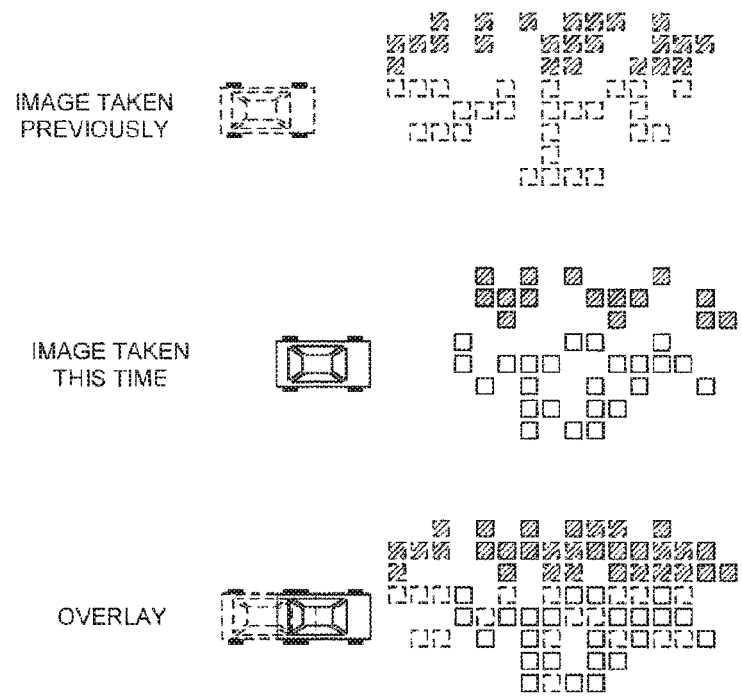
FIG. 8 is a diagrammatic illustration showing image-data overlay processing in the Embodiment 1.

FIG. 8 is a diagrammatic illustration showing the image-data overlay processing in the Embodiment 1. For example, a portion recognizable from the image previously taken is overlaid on a portion recognizable from the image taken this time. If there is a place about which distance information cannot be obtained from the image previously taken, it is possible to improve accuracy in detection of roads and environment by overlaying the distance information newly obtained from the image taken this time. As illustrated in FIG. 8, even if the ego vehicle is traveling, and the images obtained vary over time, a plurality of images are of the same zone if image-taking intervals are short because travel distance is short due to the vehicle speed. It is therefore only required to overlay the zones of the same zone on each other. Overlaying is not limited to two images. It is effective to overlay as many images as possible on one another.

If the images taken have different distance data with respect to a position recognized as the same place, priority may be given to newer data. The use of the newer data improves accuracy in recognition. An average of a plurality of data may also be used. This eliminates an effect of disturbance included in the data and the like, and stabilizes the recognition. It is also possible to extract data which does not much vary from other proximate data. This enables computation based on stable data and improvement in recognition accuracy. There are various methods of processing as described above. It is possible to combine the methods or employ any one of the methods.

(Road Edge Recognition Processing)

Figure 9:
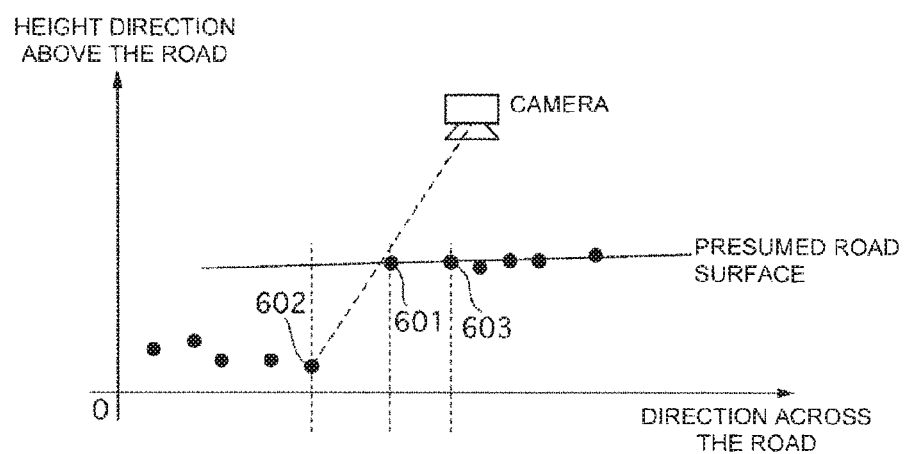
FIG. 9 is a pattern diagram showing in a direction across the road, a result of recognition obtained by taking an image of a road embankment.

FIG. 9 is a pattern diagram showing a result of recognition obtained by taking an image of a road embankment, as viewed in a direction across the road. In this case, the slope area is steep and out of the camera view. The slope area is therefore not captured in the image taken. In the screen image, it looks as if the road area and the area lower than the road directly abut on each other. In fact, however, a point 601 of the road edge and a point 602 of the outside area, which are in abutment with each other on the screen, do not abut on each other but are actually slightly separated from each other as illustrated in FIG. 9. To output that the point of the road edge is the position of the point 602 is inaccurate, so that the point 601 is outputted as the point of the road edge.

Referring to FIG. 9, let us assume that the data of the position corresponding to the point 601 is not detected, and for example, a point 603 located further on the inner side of the road than the point 601 is detected to be an endmost point among points existing on the road surface. In this case, an area between the zone corresponding to the point 602 and the zone corresponding to the point 603 is a zone which is not captured in the image also on the screen. It is then unclear as to where in the area between the zones the road edge is located. At the same time, since the point 602 located in the area lower than the road surface is observable, it can be inferred that no road exists in a direction looking down at the point 602 from the stereo camera 310. It can be therefore inferred that the road edge exists at least in the zone between the point 603 and the point 601 which is not detected in this case. For this reason, the position located between the points 603 and 602 and closer to the road than the position corresponding to the boundary portion is outputted as the road edge.

(Road Edge Recognition Processing on a Road with a Moderate Slope)

Figure 10:
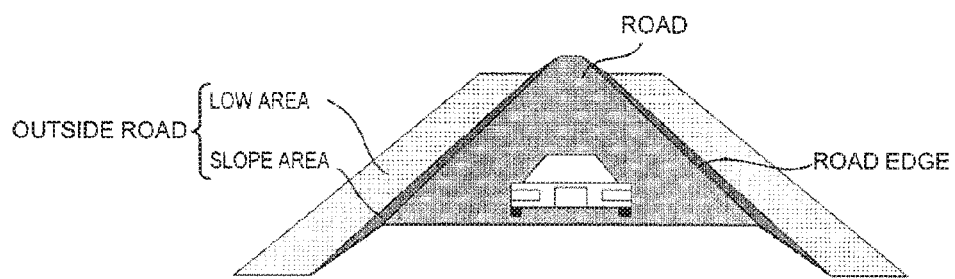
FIG. 10 is a diagrammatic illustration schematically showing a road embankment with moderate slope areas.
Figure 11:
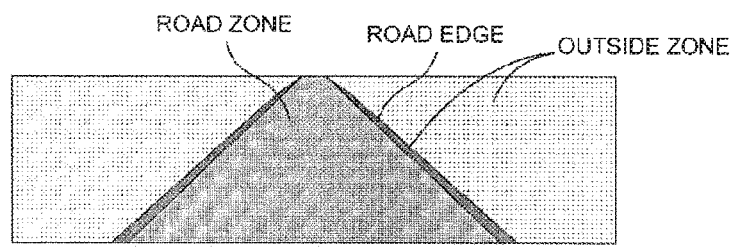
FIG. 11 is an image schematically showing a screen image of a road embankment with moderate slope areas, which is taken from the ego vehicle.

FIG. 10 is a diagrammatic illustration schematically showing a road embankment with moderate slope areas. In this road embankment, a road is formed in an upper portion of an embankment having a substantially trapezoidal cross-section. Between the road and the outside zone, a slope area is formed, and outside the slope area is a low area. FIG. 11 is an image schematically showing a screen image of a road embankment with moderate slope areas, which is taken from the ego vehicle. In this image taken, the road edge and each of the slope areas are captured in the image so as to be in abutment with each other, and the slope areas and the outside area (zone lower than the road surface) are captured in the image so as to be in abutment with each other. In the case of this road, the slope has an angle smaller than the depression angle of the stereo camera 310 (slope is moderate), so that a dead zone (zone which is not captured in an image) is not created.

Figure 12:
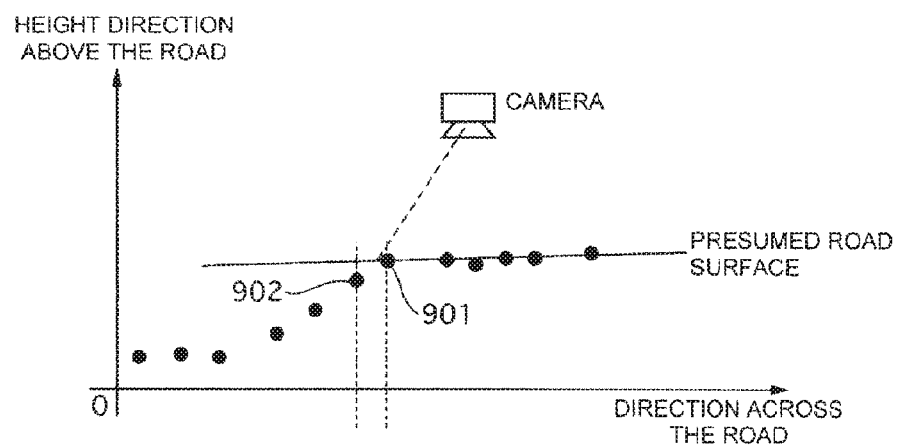
FIG. 12 is a pattern diagram showing in a direction across the road, a result of recognition obtained by taking an image of a road embankment.

FIG. 12 is a pattern diagram showing a result of recognition obtained by taking an image of a road embankment with moderate slopes, as viewed in a direction across the road. In this case, the slope is moderate and captured in the image. In the screen image, it looks as if a road area and a slope area are in abutment with each other, and the slope area and an area lower than the road are in abutment with each other. What is important here is to recognize the road edge. There is no need to distinct the slope area and the low area from each other. Therefore, points which are not located at the same level as the road surface are considered to be located outside the road. As the result, a point 901 is recognized as the edge of the road zone, and a point 902 as a point located closest to the road within the outside zone. It can be then inferred that the actual road edge exists between the points 901 and 902.

(Improvement of Accuracy in Recognition of the Road Edge)

If the road and the outside area are connected to each other with a moderate inclination intervening therebetween, the inclined portion can be imaged by the stereo camera 310 to obtain the distance information thereof. This makes it possible to detect that the inclined portion is a slope area that is not suitable for a vehicle to pass along, and also consider that a boundary between the inclined area and the road area is a road boundary (namely, a road edge).

Even if the zone lower than the road is considerably low and therefore impossible to be detected, for example, as in a case where the road is formed along a precipitous cliff or where contrast between a road and a zone on the side of the road is weak, it is still possible to recognize that the lower zone is outside the road.

Although the detected road edge is expected to be the actual edge of the road, there actually is a gap due to a detection error. Because a road edge has a weak base structure, it is sometimes inappropriate to drive along the road edge. An effective way to cope with such possibilities is to output as a road edge a position located further on the inner side of the road than the detected road edge, as necessary. Contrary to the foregoing case, when the vehicle attitude stabilizing control system is used in combination as in the Embodiment 1, it is effective to output as a road edge a position located further on the outer side of the road than the road edge, as necessary, from the standpoint of prevention of excessive control or warning.

(Handling During Virtual-Image Photographing)

The following is a case where the presence of a zone lower than a road is extracted, and the zone is judged to be located outside the road. When there is a puddle of water in the road, and a virtual image reflected on the puddle is detected, the virtual image is seemingly located lower than the road surface, so that the puddle zone is likely to be incorrectly recognized as a zone lower than the road surface. The virtual image reflected on the puddle has characteristics different from those of a real image, and is therefore excluded in distinction from zones which are actually lower than the road surface. To be more specific, the characteristics are as listed below.

a) A virtual image is created by a distant object being reflected. Therefore, there is a road surface zone, which looks closer than apparent distance of the virtual image, at a point farther than a zone in which the virtual image exists on the screen.

b) Because a water surface is not completely flat, the virtual image is sometimes significantly distorted, which generates variation in distance of the puddle zone.

c) If the water surface is unstable, the apparent position of the virtual image varies with time.

d) It looks as if there is an object in a symmetrical position to an object on the road, across the road surface (water surface).

e) If the virtual image is of a traveling vehicle, the image moves despite that it is located in the zone lower than the road surface.

The virtual image has the foregoing characteristics which are highly unlikely to be seen with real images. Detection of the foregoing characteristics makes it possible to determine that the image is not a real image but a virtual one.

[Vehicle Attitude Stabilizing Control]

Figure 13:
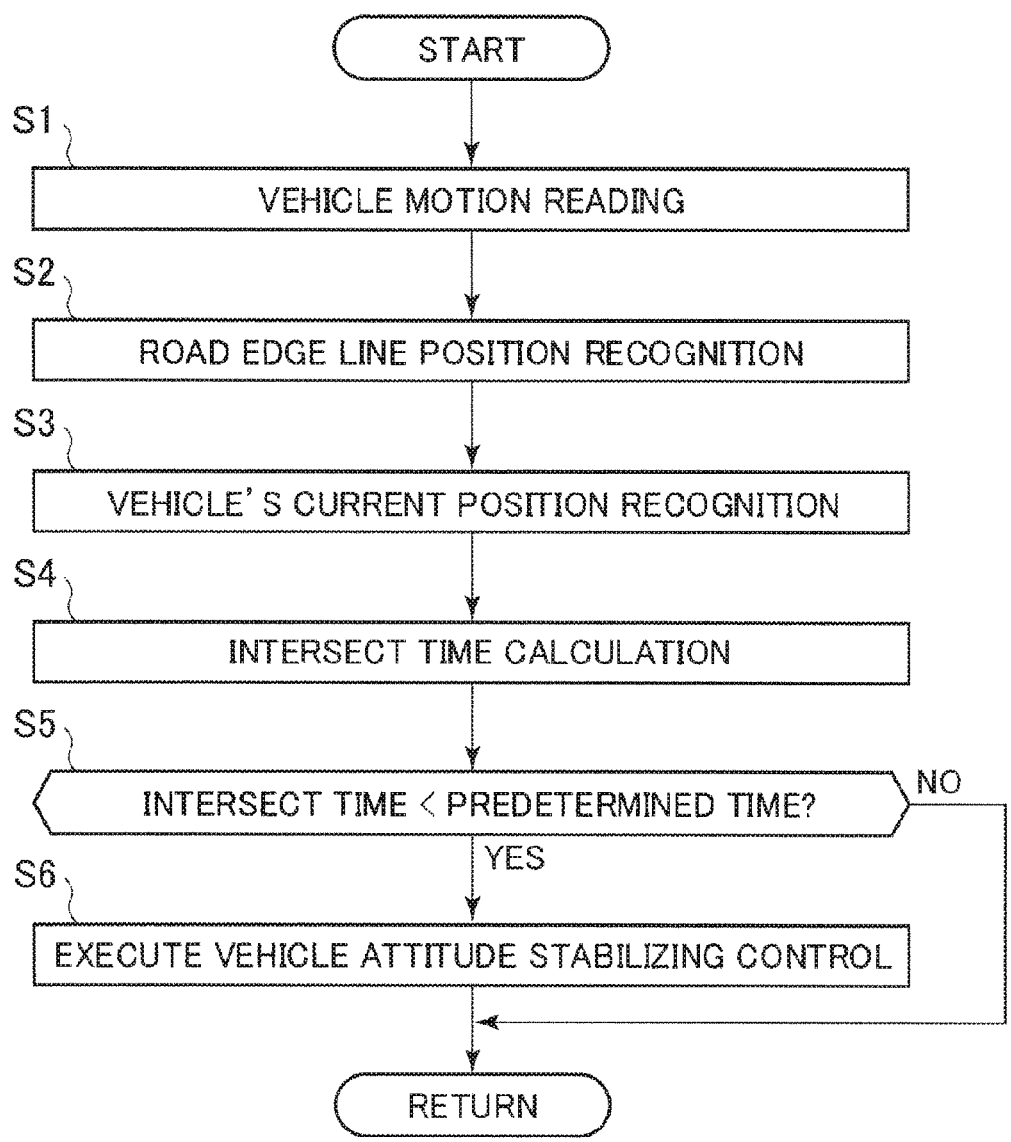
FIG. 13 is a flowchart showing processing of judging whether vehicle attitude stabilizing control is necessary, which is executed by the electronic control unit according to the Embodiment 1.

FIG. 13 is a flowchart showing processing of judging whether vehicle attitude stabilizing control is necessary, which is executed by the electronic control unit 10 of the Embodiment 1. While the vehicle is traveling, the processing is repeatedly executed, for example, with a computation period of approximately 10 milliseconds.

In Step S1, the vehicle attitude stabilizing control unit 21 reads in detection values including vehicle speed, longitudinal acceleration, lateral acceleration, yaw rate, steering angle, and steering torque, received from the vehicle motion detector 11.

In Step S2, the travel-path defining line recognition unit 22 recognizes a position of the travel-path defining line from the image of the view ahead of the ego vehicle, which is received from the travel environment recognition system 1.

In Step S3, the vehicle's current position recognition unit 23 recognizes the vehicle's current position which is the forward end of the vehicle as viewed in the traveling direction of the ego vehicle. The vehicle's current position recognition unit 23 also obtains a traveling-direction virtual line extending from the ego vehicle in the traveling direction.

In Step S4, the intersect time calculation unit 24 computes an intersect time, namely, a time period in which the ego vehicle travels at current speed from the vehicle's current position to an intersection of the traveling-direction virtual line and the travel-path defining line. The virtual travel-path defining line calculation unit 25 calculates a virtual travel-path defining line. The virtual travel-path defining line is a tangent of the travel-path defining line at a point close to a vehicle's estimated position. The vehicle's estimated position is, for example, an intersection of the traveling-direction virtual line and the travel-path defining line.

In Step S5, the activation necessity judgment unit 26 makes a judgment as to whether the intersect time is shorter than a predetermined time. If the intersect time is shorter than the predetermined time, the routine advances to Step S6. If the intersect time is equal to or longer than the predetermined time, the routine ends. This is because a feeling of strangeness is given to the driver if a control amount is provided before the driver actually drives along the travel-path defining line ahead of the vehicle when the intersect time is longer than the predetermined time.

In Step S6, the vehicle attitude stabilizing control unit 21 activates the electrically-assisted power steering 2 and/or the hydraulic brake unit 3 according to a yaw moment control amount, applies yaw moment and/or deceleration to the vehicle, and executes the vehicle attitude stabilizing control. The vehicle attitude stabilizing control unit 21 uses one or more of the detection values including the vehicle speed, longitudinal acceleration, lateral acceleration, yaw rate, steering angle, and steering torque, which are read in at Step S1, to execute the vehicle attitude stabilizing control.

(Details of the Vehicle Attitude Stabilizing Control)

Figure 14:
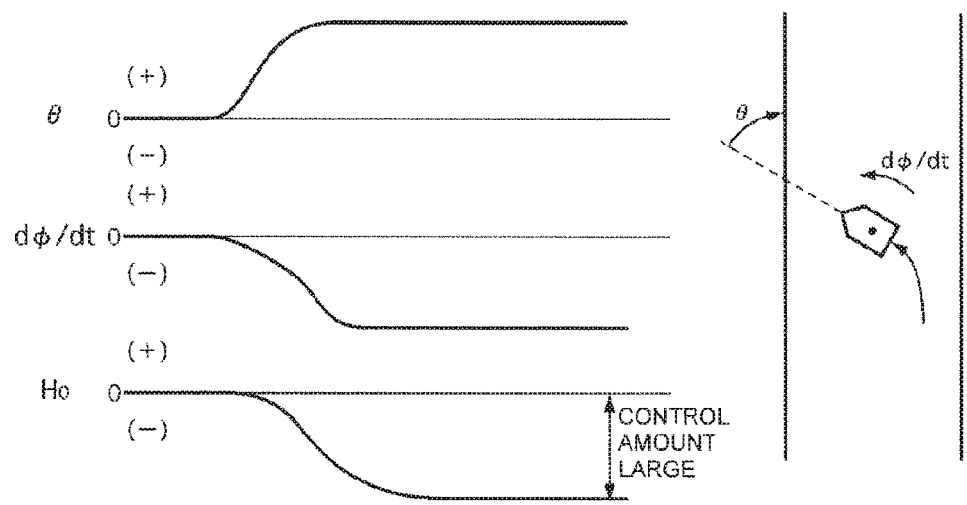
FIG. 14 is a pattern diagram showing the ego vehicle turning toward a travel-path defining line.

Details of the vehicle attitude stabilizing control processing will be explained below. FIG. 14 is a pattern diagram showing the ego vehicle turning toward the travel-path defining line. FIG. 14 shows a state in which the ego vehicle turns in a direction toward the travel-path defining line while traveling on a straight roadway. A sign of a yaw rate $d\varphi/dt$ of the ego vehicle is defined as positive when the vehicle is turning right, negative when the vehicle is turning left, and zero when the vehicle is parallel to the travel-path defining line. In view of relationship between the yaw rate $d\varphi/dt$ and the formed angle $\theta$ in the situation illustrated in FIG. 14, the yaw rate $d\varphi/dt$ changes into negative since the vehicle is turning left, and the formed angle $\theta$ into positive. The sign of the yaw rate $d\varphi/dt$ and that of the formed angle $\theta$ disagree with each other.

Figure 15:
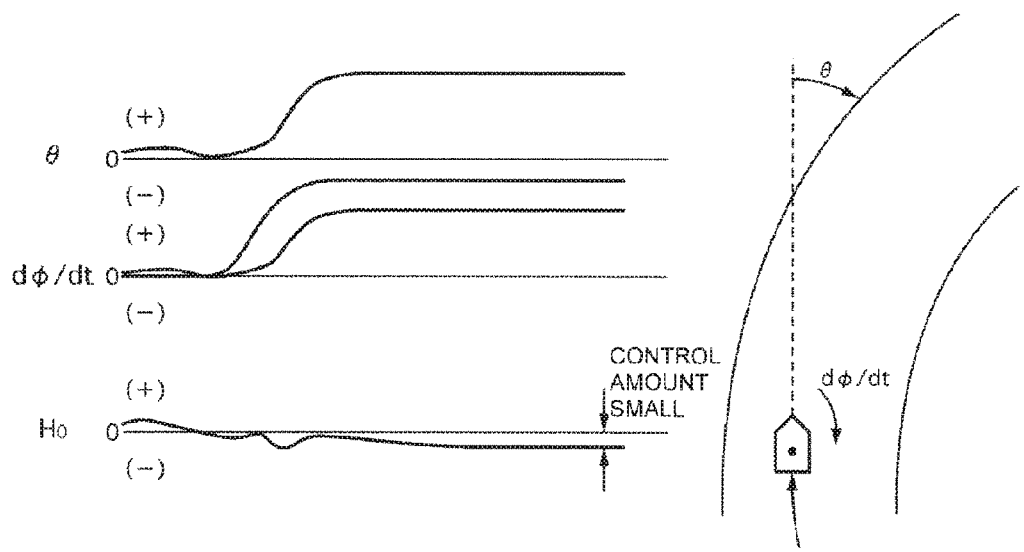
FIG. 15 is a pattern diagram showing the ego vehicle traveling on a curved roadway and turning in a direction away from the travel-path defining line.

FIG. 15 is a pattern diagram showing the ego vehicle traveling on a curved roadway and turning in a direction away from the travel-path defining line. In the situation illustrated in FIG. 15, since the travel path curves to the right, the traveling direction (traveling-direction virtual line) of the ego vehicle intersects with the travel-path defining line on the left. When the driver becomes aware of the curve and turns the steering wheel to the right, the formed angle θ changes into positive, whereas the sign of the yaw rate dφ/dt of the ego vehicle is positive because of the right turn, which agrees with the sign of the formed angle θ. The following description explains relationship between the agreement/disagreement of signs of the yaw rate dφ/dt and the formed angle θ and the control amount.

As illustrated in FIG. 14, for example, when the vehicle turns toward the travel-path defining line while traveling straight, the vehicle is hardly in a stable attitude. In this case, yaw moment should be applied in a direction away from the travel-path defining line. Even if the traveling-direction virtual line and the travel-path defining line intersect with each other on a curved roadway as illustrated in FIG. 15, it can be considered that the vehicle attitude is stable if the driver operates the steering wheel, and the turning direction of the ego vehicle is the same as the curved roadway.

It is therefore desired to impart a yaw moment control amount for making stable (stabilizing) the vehicle attitude upon consideration of the foregoing travel motions. Relationship between the yaw rate (dφ/dt) and vehicle speed V is expressed as follows:

$$(d\varphi/dt)=V/r$$

where r denotes a turning radius. Therefore, the following is true:

$$1/r=(d\varphi/dt)/V$$

where (1/r) is curvature. The curvature is a value indicative of a turning state of the vehicle, regardless of vehicle speed, and can be therefore handled in the same manner as the formed angle θ.

The evaluation function Ho(t) at a time t, which is obtained in light of the foregoing matters, is set as follows:

$$Ho(t)=A\{(d\varphi/dt)/V\}(t)-B\theta(t)$$

where A and B are constants.

The evaluation function Ho(t) represents the yaw moment control amount which should be imparted according to difference between the turning condition [A{(dφ/dt)/V}(t)] of the ego vehicle and the condition of the actual travel-path defining line. If the evaluation function Ho(t) indicates a large positive value while the vehicle is turning right, it is necessary to apply a left yaw moment. It is then required to apply a braking force to the left wheel or execute steering torque control which facilitates a left turn. If the evaluation function Ho(t) indicates a negative value with a large absolute value while the vehicle is turning left, it is necessary to apply a right yaw moment. It is therefore required to apply a braking force to the right wheel or execute steering torque control which facilitates a right turn.

Using the evaluation function Ho(t) eliminates the feeling of strangeness because the value of the evaluation function Ho(t) is small, and the yaw moment control amount to be imparted is also small when the driver drives along the travel-path defining line. If the driver drives toward the travel-path defining line, the value of the evaluation function Ho(t) is large, and the yaw moment control amount to be imparted is also large. This firmly secures the stability of the vehicle attitude.

As a comparative example to be compared with the invention according to the Embodiment 1, the following description explains a technology of calculating a target yaw rate by dividing the formed angle between a travel locus along the recognized travel-path defining line and the traveling-direction virtual line by an arrival time which is time that elapses before arrival to the travel-path defining line. As in the comparative example, if a value resulted from the division by the arrival time is used as the yaw moment control amount, the yaw rate is gradually corrected in the process where the vehicle approaches the travel-path defining line. This causes the problem that it takes time until a travel motion along the travel-path defining line is achieved.

According to the Embodiment 1, the yaw moment control amount is imparted according to the evaluation function Ho(t) based on difference between the curvature (1/r) indicative of a current turning state of the vehicle and the formed angle θ. For that reason, it is output such a control amount that the vehicle immediately becomes parallel to the travel-path defining line before the vehicle actually reaches the travel-path defining line, regardless of distance to the travel-path defining line (regardless of the intersect time). This enables highly safe control. Furthermore, since the control amount is computed using the relationship between the curvature and the formed angle θ, when control is not required as in a situation where the vehicle travels along the travel-path defining line, the vehicle attitude stabilizing control does not intervene even if the formed angle θ is created, so that the driver is not given the feeling of strangeness.

Figure 16:
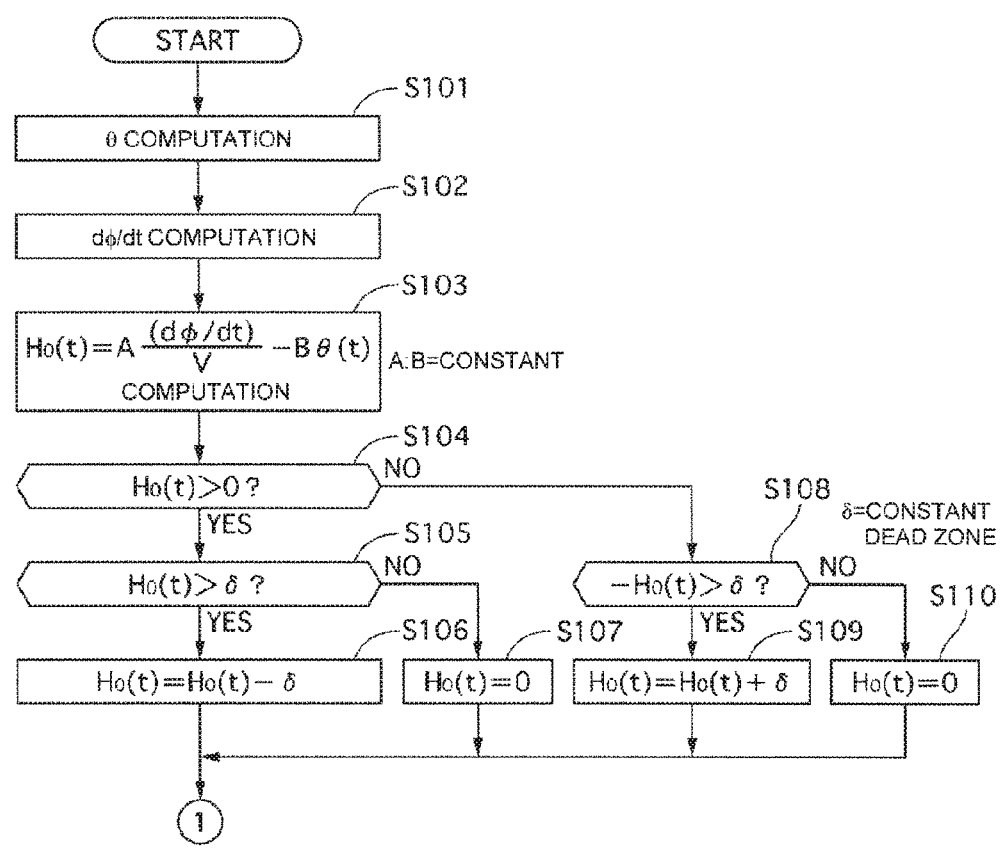
FIG. 16 is a flowchart showing vehicle-attitude stabilizing control processing of the Embodiment 1.
Figure 17:
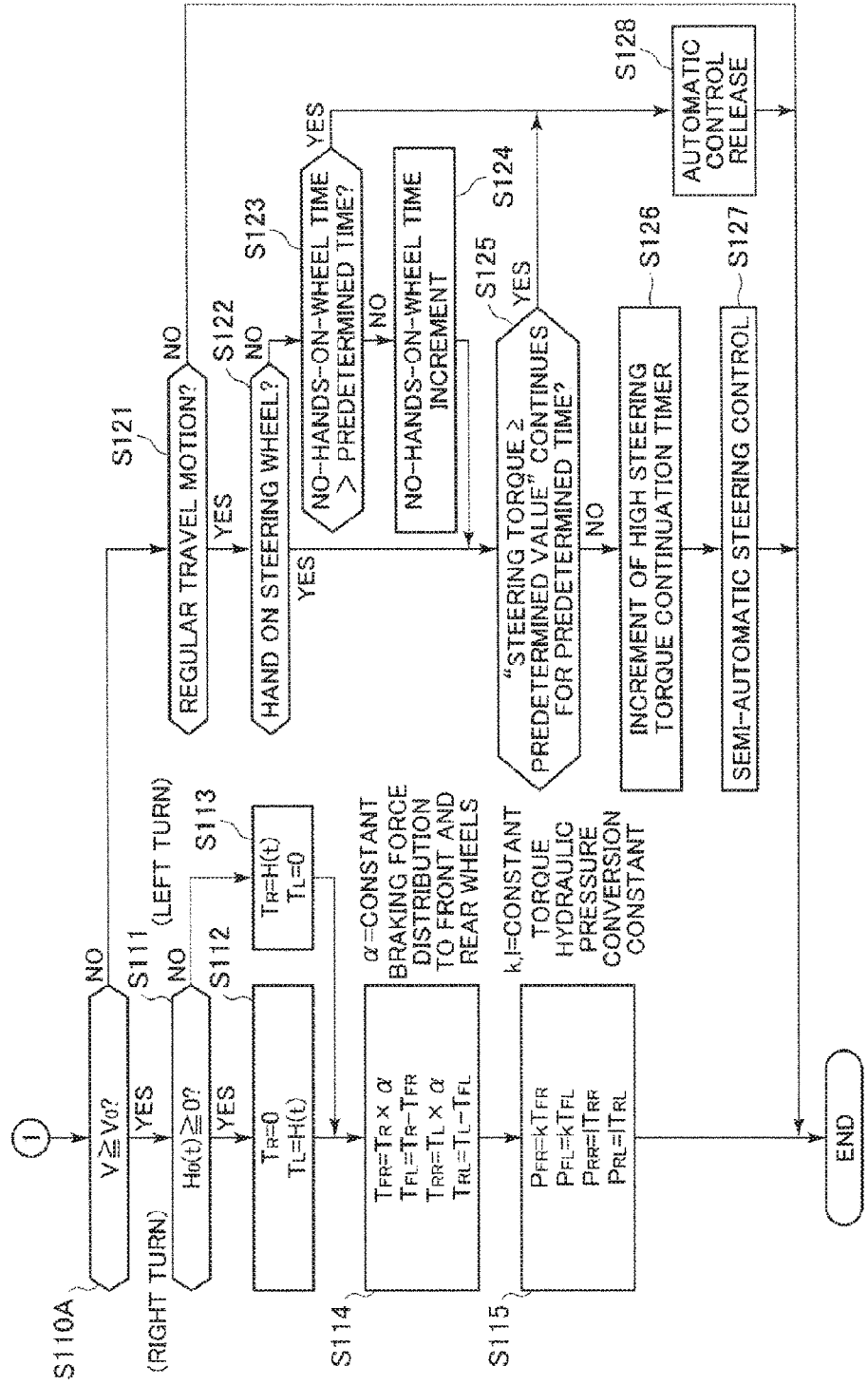
FIG. 17 is a flowchart showing the vehicle-attitude stabilizing control processing of the Embodiment 1.

FIGS. 16 and 17 are flowcharts showing the vehicle attitude stabilizing control processing of the Embodiment 1. The flow relates to control processing executed by the vehicle attitude stabilizing control unit 21 when it is judged that the vehicle attitude stabilizing control is necessary in the step shown in FIG. 13, which judges the necessity of the vehicle attitude stabilizing control.

Step S101 computes the formed angle θ between the traveling direction of the ego vehicle and the travel-path defining line. More specifically, Step S101 obtains the formed angle between the traveling-direction virtual line and the virtual travel-path defining line, which are calculated in Steps S3 and S4 of FIG. 13.

Step S102 computes the yaw rate (dφ/dt) of the ego vehicle. The yaw rate may be a yaw rate sensor value detected by the vehicle motion detector 11. The yaw rate may be computed from vehicle speed or steering angle according to a vehicle motion model. There is no particular limitation.

Step S103 computes the evaluation function Ho(t) from the formed angle θ, the yaw rate (dφ/dt), and the vehicle speed V.

Step S104 makes a judgment as to whether the evaluation function Ho(t) is positive. If the evaluation function Ho(t) is positive, the routine proceeds to Step S105. If the evaluation function Ho(t) is zero or smaller, the routine advances to Step S108.

Step S105 makes a judgment as to whether the evaluation function Ho(t) is larger than a predetermined value δ indicative of a dead band which is set in advance, and if the evaluation function Ho(t) is larger, the routine proceeds to Step S106. If the evaluation function Ho(t) is smaller than the predetermined value δ, the routine advances to Step S107.

Figure 18:
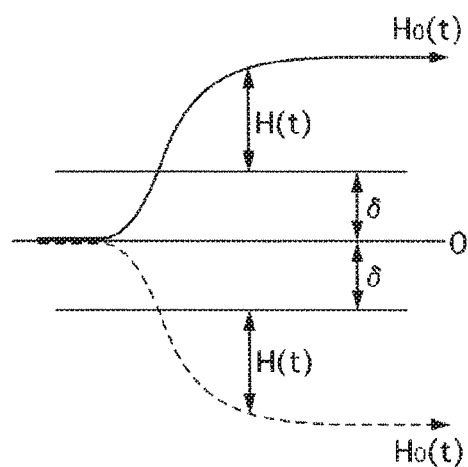
FIG. 18 is a pattern diagram showing relationship between an evaluation function Ho(t) and a predetermined value according to the Embodiment 1.

Step S106 sets the control amount H(t) at a value obtained by subtracting the predetermined value δ from the evaluation function Ho(t). FIG. 18 is a pattern diagram showing relationship between the evaluation function Ho(t) and the predetermined value δ. A value of excess of the evaluation function Ho(t) over the predetermined value δ is computed as the control amount H(t).

Step S107 sets the control amount H(t) at zero.

Step S108 makes a judgment as to whether a value obtained by multiplying the evaluation function Ho(t) by minus (the evaluation function Ho(t) is a negative value and turns into a positive value if being multiplied by minus) is larger than the predetermined value δ. If the value is larger, the routine moves to Step S109. If the value is smaller than the predetermined value δ, the routine proceeds to Step S110.

Step S109 sets the control amount H(t) at a value obtained by adding the predetermined value δ to the evaluation function Ho(t).

Step S110 sets the control amount H(t) at zero.

Step S110A makes a judgment as to whether the vehicle speed is equal to or higher than predetermined vehicle speed Vo. If the vehicle speed is equal to or higher than the predetermined vehicle speed Vo, it is judged that the yaw moment control using a brake braking torque is effective. The routine then advances to Step S111. If the vehicle speed V is lower than the predetermined vehicle speed Vo, it is judged that the yaw moment control by the steering rather than the brake is effective. The routine then moves to Step S121.

Step S111 makes a judgment as to whether the control amount H(t) is equal to or larger than zero. If the control amount H(t) is equal to or larger than zero, the routine proceeds to Step S112. If the control amount H(t) is negative, the routine proceeds to Step S113.

In Step S112, it can be judged that a right turn needs to be suppressed. A right-wheel base control amount TR is thus set at zero, and a left-wheel base control amount TL at H(t).

In Step S113, it can be judged that a left turn needs to be suppressed. The right-wheel base control amount is set at H(t), and the left-wheel base control amount TL at zero.

Step S114 calculates the braking torque with respect to each wheel according to the following relational expressions.

Front-right wheel braking torque $TFR=TR \times \alpha$

Rear-right wheel braking torque $TRR=TR-TFR$

Front-left wheel braking torque $TFL=TL \times \alpha$

Rear-left wheel braking torque $TRL=TL-TFL$ where α is a constant and a value that is set according to brake force distribution to the front and rear wheels.

Step S115 calculates a wheel-cylinder hydraulic pressure of each wheel according to the following relational expressions.

Front-right wheel cylinder hydraulic pressure $PFR=K \times TFR$

Front-left wheel cylinder hydraulic pressure $PFL=K \times TFL$

Rear-right wheel cylinder hydraulic pressure $PRR=L \times TRR$

Rear-left wheel cylinder hydraulic pressure $PRL=L \times TRL$ where K and L are constants and conversion constants for converting torque into hydraulic pressure.

Step S121 makes a judgment as to whether the vehicle is in a regular traveling state. If it is judged that the vehicle is in the regular traveling state, the routine proceeds to Step S122. In cases other than the foregoing state (post-collision state, spinning state, a state where the vehicle departs from the road surface), the present control flow is terminated.

Step S122 makes a judgment as to whether a hand is on the steering wheel. If it is judged that a hand is on the steering wheel, the routine advances to Step S125. If it is judged that no hand is on the steering wheel, the routine moves to Step S123. Whether a hand is on the steering wheel may be checked, for example, by analyzing inertia of the steering wheel on the basis of resonance frequency components of a torque sensor or by providing a touch sensor or the like to the steering wheel to judge if a hand is on the wheel.

Step S123 makes a judgment as to whether a no-hands-on-wheel time exceeds predetermined time. If the no-hands-on-wheel time exceeds the predetermined time, the routine moves to Step S128 where automatic control release is executed. If the no-hands-on-wheel time does not exceed the predetermined time, the routine advances to Step S124 where the no-hands-on-wheel time is incremented. The routine then moves to Step S125. If automatic steering is allowed while no hand is on the steering wheel, the driver might overly rely on the present control system and lose attention during driving.

Step S125 makes a judgment as to whether a state in which the steering torque is equal to or higher than a predetermined value continues for predetermined time. If such a state continues for the predetermined time, it is judged that the driver steers the vehicle with the intention, and the routine moves to Step S128 where the automatic control release is carried out. When the state in which the steering torque is equal to or larger than the predetermined value does not continue for the predetermined time, namely, when the steering torque is low or not continuously applied even if high, the routine proceeds to Step S126 where a high steering torque continuation timer is incremented.

Step S127 executes semi-automatic steering control. The semi-automatic steering control is control which carries out automatic steering according to the travel motion of the vehicle, regardless of the driver's intention, and switches the automatic steering control to regular steering assist control when the no-hands-on-wheel state is confirmed or a high steering torque is applied in a continuous manner. According to the automatic steering control, a target steering angle and the target yaw rate for achieving the control amount H(t) are set. Electric motor control switches from torque control for applying an assist torque to rotation angle control, and an activate command is outputted to the electric motor so as to turn the steering wheel up to the target steering angle according to target steering-wheel turning speed.

Figure 19:
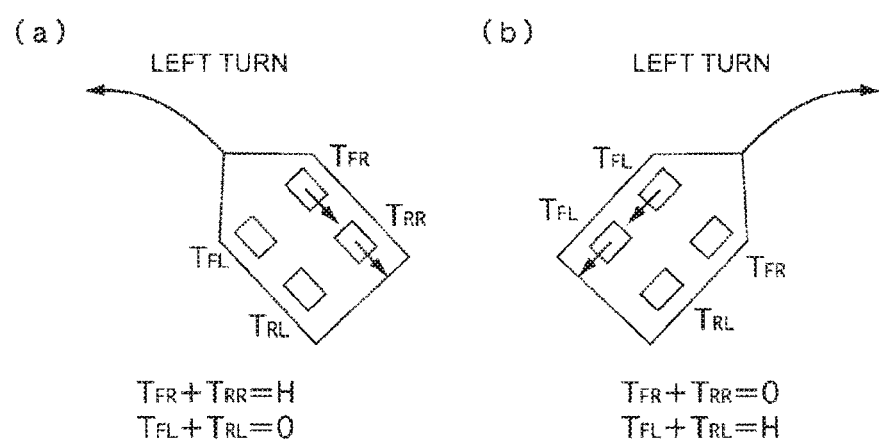
FIG. 19 is a schematic explanatory view showing relationship of braking forces applied to suppress the turn of the vehicle when the vehicle is turning at a predetermined or higher speed according to the Embodiment 1.

FIG. 19 is a schematic explanatory view showing relationship between braking forces applied to suppress the turning when the vehicle turns at predetermined or higher vehicle speed according to the Embodiment 1. When the control amount H(t) is positive and indicates the right turn state, it is required to apply the left yaw moment. When the control amount H(t) is negative and indicates the left turn state, it is required to apply the right yaw moment. The supply of the wheel-cylinder hydraulic pressure with respect to each wheel, which is calculated in Step S115, stabilizes the vehicle attitude and promptly applies the yaw moment which makes the vehicle parallel to the travel-path defining line.

Figure 20:
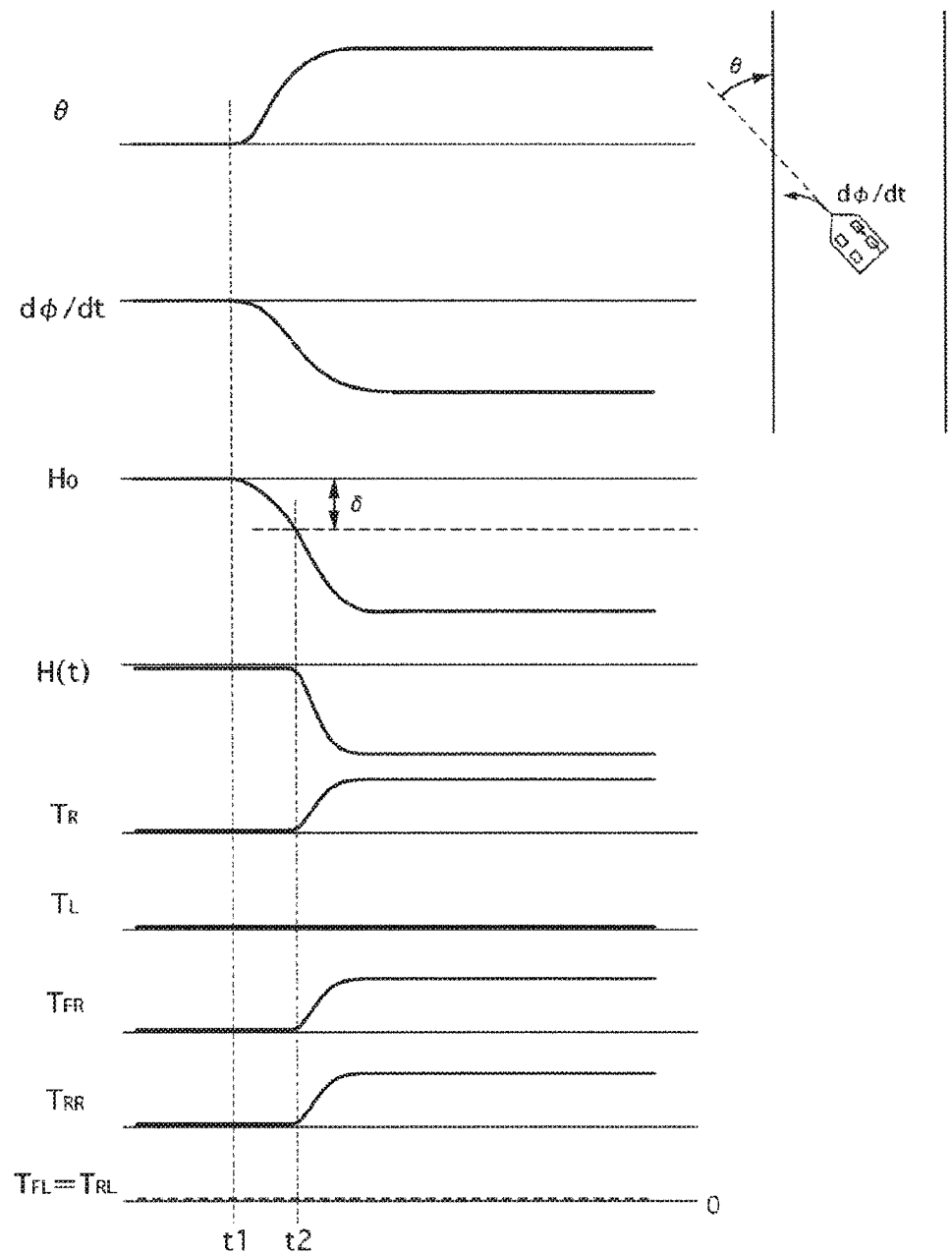
FIG. 20 is a timeline chart of a situation where the vehicle-attitude stabilizing control processing is executed on a straight roadway according to the Embodiment 1.

FIG. 20 is a timeline chart of a situation where the vehicle attitude stabilizing control processing is executed on a straight roadway according to the Embodiment 1. FIG. 20 shows a situation where the vehicle turns left due to a disturbance, such as a crosswind, while traveling straight, and the formed angle is created in the left-side travel-path defining line.

At time t1, the left yaw rate dφ/dt is generated by crosswind, and simultaneously, the formed angle θ starts being created in the travel-path defining line on the left. The value of the evaluation function Ho(t) also starts changing. In this situation, because of the left turn state which increases the formed angle, the sign of the yaw rate dφ/dt and that of the formed angle θ disagree with each other. The evaluation function Ho(t) changes so that the absolute value is large on the negative side. The vehicle attitude stabilizing control is not executed until the absolute value becomes larger than the predetermined value δ. This suppresses an excessive control intervention and thus prevents the driver from having the feeling of strangeness.

At time t2, the evaluation function Ho(t) becomes equal to or larger than the predetermined value δ, and the control amount H(t) is calculated. Thereafter, the right-wheel base control amount TR is calculated, and the front right-wheel braking torque TFR and the rear right-wheel braking torque TRR are calculated. At this time, the front left-wheel braking torque TFL and the front left-wheel braking torque TRL are set at zero. The vehicle is thus applied with the right yaw moment and makes a turn so that the vehicle traveling direction (traveling-direction virtual line) is parallel to the direction of the travel-path defining line.

Figure 21:
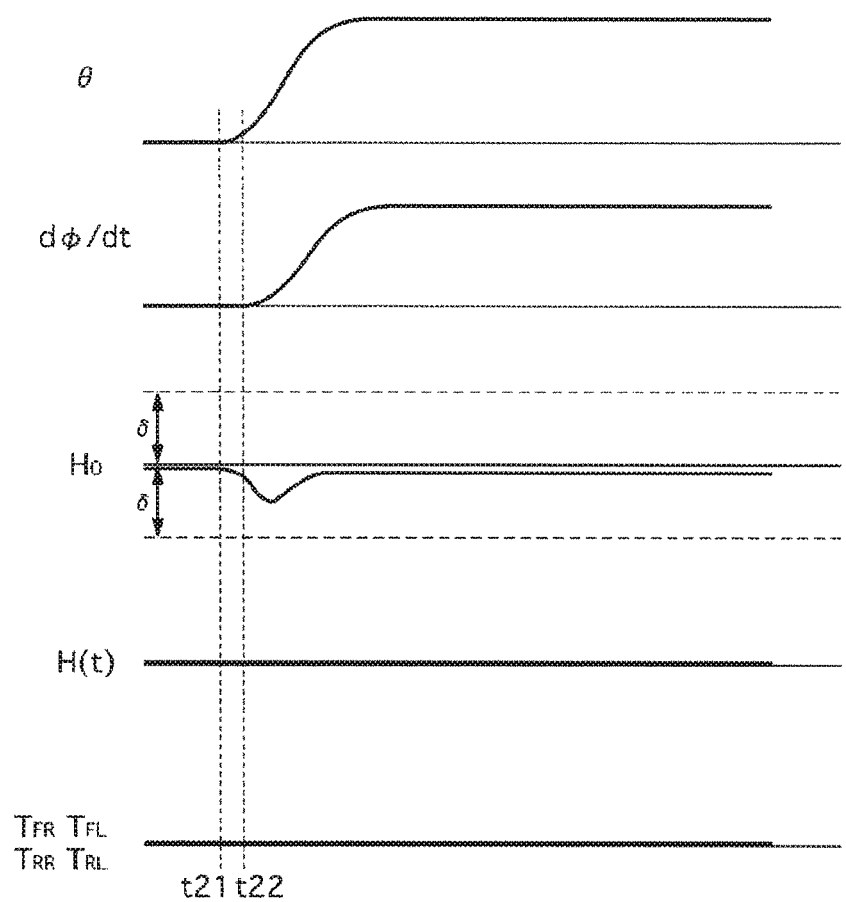
FIG. 21 is a timeline chart showing an active condition of the vehicle-attitude stabilizing control processing which is executed on a curved roadway while the vehicle is traveling at a predetermined or higher speed according to the Embodiment 1.

FIG. 21 is a timeline chart showing an active condition of the vehicle attitude stabilizing control processing executed on a curved roadway at predetermined or higher vehicle speed according to the Embodiment 1. FIG. 21 shows a situation where the driver properly operates the steering wheel on the curved roadway and drives along the travel-path defining line.

At time t21, the travel-path defining line of the curved roadway appears ahead of the vehicle, and the formed angle θ starts being created between the travel-path defining line and the vehicle traveling direction (traveling-direction virtual line). At this point of time, the vehicle does not yet enter the curve, so that the driver does not operate the steering wheel, and the yaw rate dφ/dt is not generated. Although the evaluation function Ho(t) begins indicating negative values, these values are smaller than the predetermined value δ.

At time t22, the driver operates the steering wheel to drive along the curved roadway, the yaw rate dφ/dt then starts being generated in the vehicle. The sign of yaw rate dφ/dt agrees with that of the formed angle θ, and the absolute value of the evaluation function Ho(t) becomes small. If the vehicle travels along the travel-path defining line, the value of the evaluation function Ho(t) is substantially zero, and remains within a range of plus or minus δ. The vehicle attitude stabilizing control is therefore basically not executed. It is thus possible to avoid the feeling of strangeness which is caused by unnecessary control intervention.

(Control Processing at Occurrence of Spinning)

The following description refers to processing of setting a spin flag which is used to make a judgment at Step S121 as to whether a vehicle is in a regular traveling state. This spin judgment is to judge a spinning state on the basis of relationship between a leading vehicle and the ego vehicle.

Figure 22:
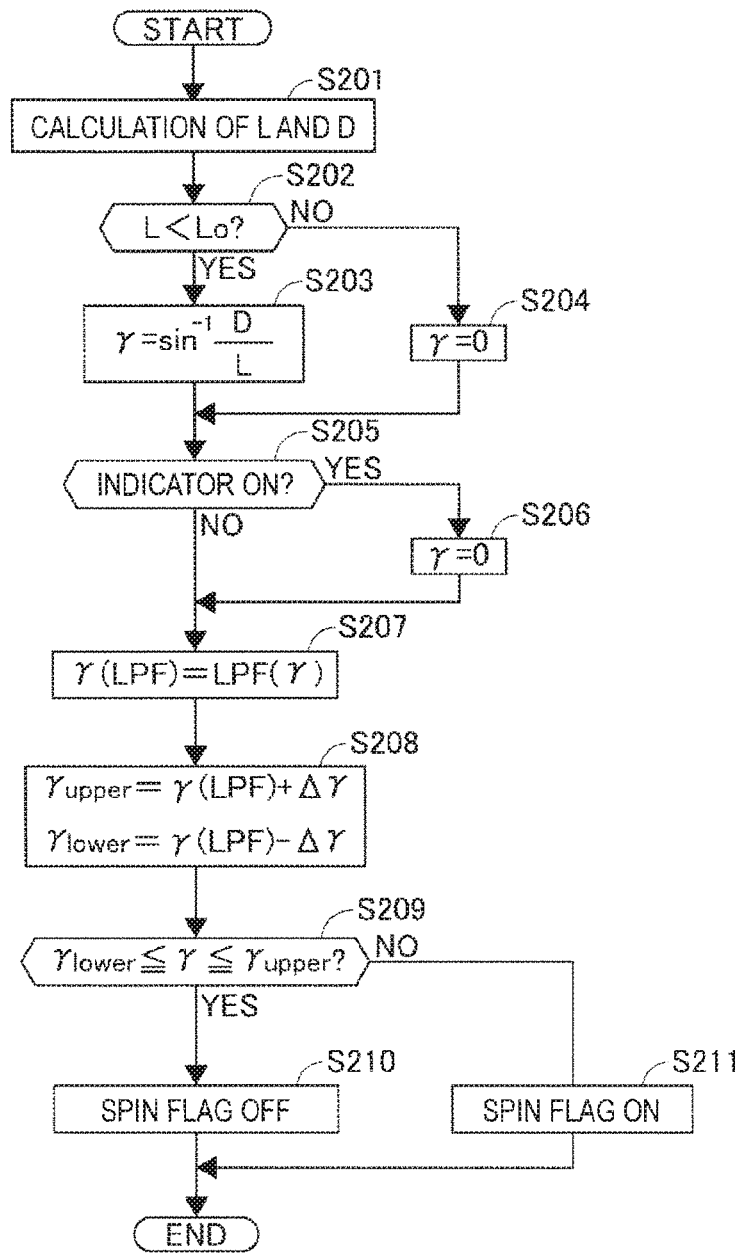
FIG. 22 is a flowchart showing spin judgment processing according to the Embodiment 1.

FIG. 22 is a flowchart showing spin judgment processing according to the Embodiment 1.

Figure 23:
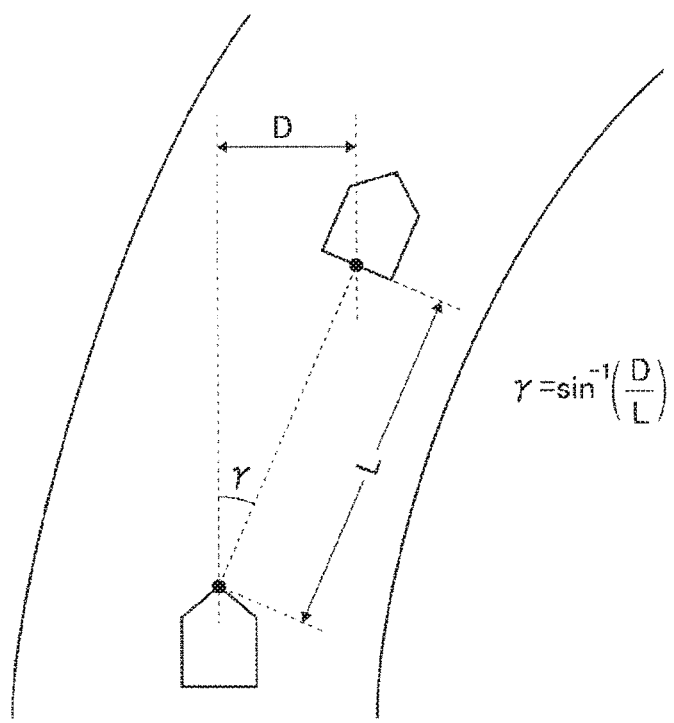
FIG. 23 is a pattern diagram showing positional relationship between the ego vehicle and a leading vehicle.

In Step S201, the vehicle-attitude stabilizing control unit 21 calculates distance L between the ego vehicle and the leading vehicle and distance D between the center of the leading vehicle and the traveling-direction virtual line of the ego vehicle on the basis of an image taken by the stereo camera 310. FIG. 23 is a pattern diagram showing positional relationship between the ego vehicle and the leading vehicle. As illustrated in FIG. 23, the Embodiment 1 calculates the distance between a substantial center of the front of the ego vehicle and a substantial center of the rear of the leading vehicle, the distance being denoted by L, and calculates the distance between the traveling-direction virtual line of the ego vehicle and the substantial center of the rear of the leading vehicle, the distance being denoted by D. As the position of the ego vehicle, a position of the center of gravity or the like may be used, instead of the vehicle front. Likewise, as the position of the leading vehicle, the position of the center of gravity, a position estimated to be the center of a turn, or the like, may be used, instead of the vehicle rear. There is no particular limitation.

In Step S202, the vehicle-attitude stabilizing control unit 21 makes a judgment as to whether the distance L is shorter than predetermined distance $L_0$. If the distance L is shorter than $L_0$, it is judged that the leading vehicle is traveling in the same manner as the ego vehicle. The routine thus advances to Step S203. If the distance L is equal to or longer than $L_0$, it is judged that the leading vehicle is not informative to the ego vehicle. The routine then moves to Step S204.

In Step S203, the vehicle-attitude stabilizing control unit 21 calculates a relative slip angle γ based on the relationship between the ego vehicle and the leading vehicle from an expression below (see FIG. 23).

$$\gamma = \sin^{-1}(D/L)$$

In Step S204, the relationship is with the leading vehicle which is not informative to the ego vehicle, so that the vehicle-attitude stabilizing control unit 21 sets γ to zero.

In Step S205, the vehicle-attitude stabilizing control unit 21 makes a judgment as to whether an indicator is ON. If the indicator is ON, it is envisaged that the vehicle is about to change lanes, which means that a relative relationship with the leading vehicle is changing with the driver's intention. The routine proceeds to Step S206, which sets the relative slip angle γ to zero. If the indicator is OFF, the routine moves to Step S207.

In Step S207, the vehicle-attitude stabilizing control unit 21 passes γ through a low-pass filter LPF having a predetermined time constant, and thus calculates γ(LPF), namely, γ which has passed through the filter.

In Step S208, the vehicle-attitude stabilizing control unit 21 adds Δγ to γ(LPF) to calculate $\gamma_{upper}$ which is an upper limit value of a spin judgment threshold value, and subtracts Δγ from γ(LPF) to calculate $\gamma_{lower}$ lower which is a lower limit value of the spin judgment threshold value.

In Step S209, the vehicle-attitude stabilizing control unit 21 makes a judgment as to whether the relative slip angle γ falls within a range of the spin judgment threshold values ($\gamma_{lower}$ or larger and $\gamma_{upper}$ or smaller). If the relative slip angle γ falls within the range, the routine advances to Step S210, which switches the spin flag OFF. If γ exceeds the range of the spin judgment threshold values, however, it is judged that a spin has occurred. The routine then moves to Step S211, which switches the spin flag ON.

Figure 24:
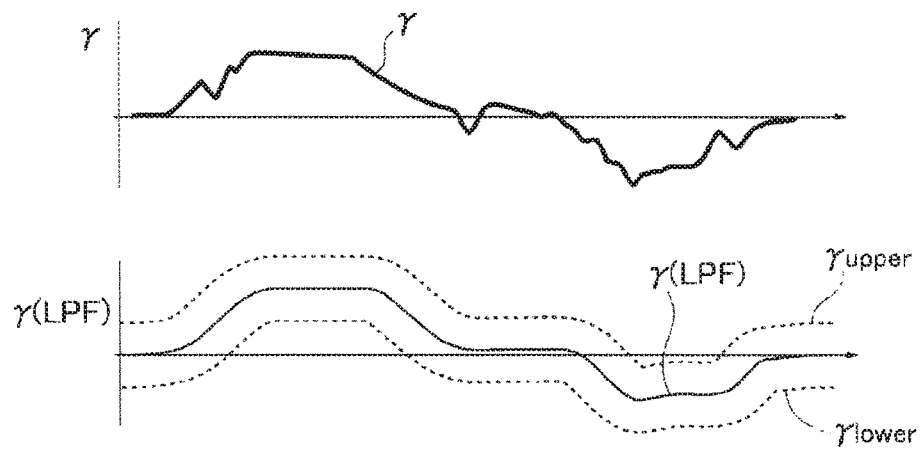
FIG. 24 is a timeline chart showing transition of a relative slip angle when the ego vehicle does not spin and travels along motion of the leading vehicle.

FIG. 24 is a timeline chart showing transition of the relative slip angle when the ego vehicle does not spin and travels along motion of the leading vehicle. If the ego vehicle follows the leading vehicle turning right and then turning left, the ego vehicle moves with transition of a value of the relative slip angle γ as shown by a thick line in FIG. 24. At this time, γ(LPF) is outputted with predetermined delay while negating minor changes during the foregoing turns, and $\gamma_{upper}$ and $\gamma_{lower}$ are set above and below the value.

Without the occurrence of spinning, the ego vehicle does not draw apart in a large way from motion of the leading vehicle, and the relative slip angle γ varies within a range between $γ_{upper}$ and $γ_{lower}$.

Figure 25:
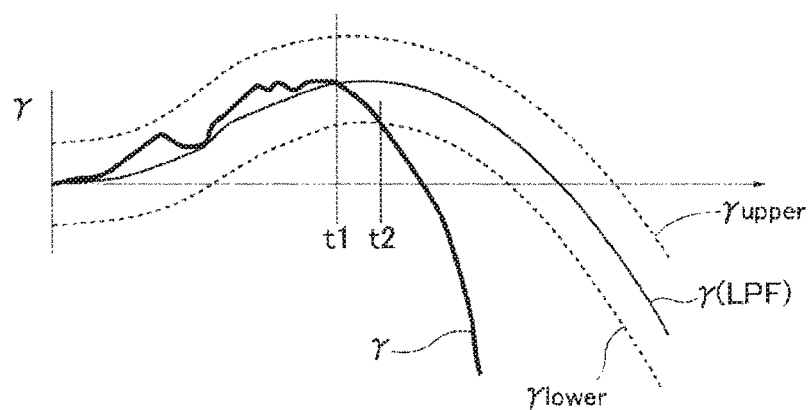
FIG. 25 is a timeline chart showing the transition of the relative slip angle when spinning occurs according to the Embodiment 1.

FIG. 25 is a timeline chart showing the transition of the relative slip angle when spinning occurs. At first, the relative slip angle γ varies within the range between $γ_{upper}$ and $γ_{lower}$ as in FIG. 24. Once the ego vehicle starts spinning at time t1, the relative slip angle γ drastically decreases. At time t2, the relative slip angle γ decreases lower than $γ_{lower}$. It is therefore judged at time t2 that spinning is occurring, and the spin flag is switched ON. More specifically, if the ego vehicle spins while the leading vehicle is normally traveling along the travel-path defining line, the relative slip angle in relation to the leading vehicle starts fluctuating at once, regardless of a curving condition of the travel-path defining line. If this fluctuation is detected, a precise detection of a spinning state is enabled, regardless of a shape of the travel-path defining line.

Figure 26:
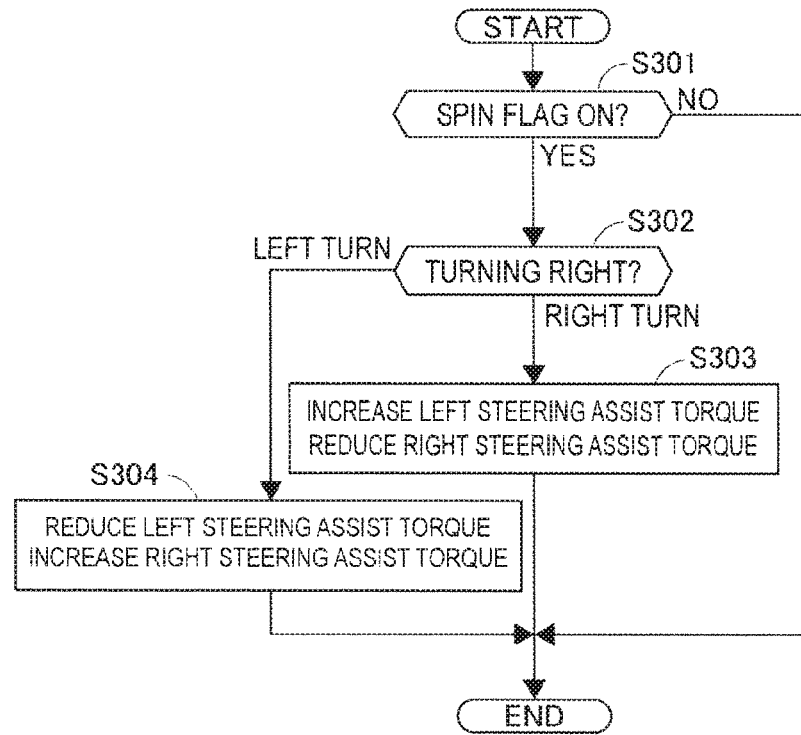
FIG. 26 is a flowchart showing spin suppression control processing when spinning occurs according to the Embodiment 1.

FIG. 26 is a flowchart showing spin suppression control processing when spinning occurs according to the Embodiment 1.

In Step S301, the vehicle-attitude stabilizing control unit 21 makes a judgment as to whether the spin flag is ON. If the spin flag is ON, it is judged that spinning is occurring. The routine proceeds to Step S302. If the spin flag is OFF, the present control flow is terminated. Step S301 is a part of processing of making a judgment as to whether the vehicle is in the regular traveling state (whether the vehicle is in an irregular traveling state, such as a post-collision state, spinning state, and a state where the vehicle departs from the road surface) in Step S121 of FIG. 17. If the spin flag is ON, it is judged that the vehicle is not in the regular traveling state (the result is NO in Step S121). Spin suppression control processing of Steps S302 to S304 is executed.

In Step S302, the vehicle-attitude stabilizing control unit 21 makes a judgment as to whether the vehicle is turning right. If the vehicle is turning right, the routine moves to Step S303. If the vehicle is turning left, the routine advances to Step S304.

In Step S303, since the vehicle is turning right, the vehicle-attitude stabilizing control unit 21 increases a left steering assist torque to be higher than a regular assist torque and reduces a right steering assist torque to be lower than the regular assist torque so that countersteering may be easily applied by steering to the left. This makes it easier for the driver to apply the countersteering, and thus ensures the stability of the vehicle. To "apply countersteering" here means to provide a predetermined steering angle on the side opposite to a turning direction to suppress a yaw motion of the vehicle (which corresponds to yaw moment control).

In Step S304, since the vehicle is turning left, the vehicle-attitude stabilizing control unit 21 increases the right steering assist torque to be higher than the regular assist torque and reduces the left steering assist torque to be lower than the regular assist torque so that countersteering may be easily applied by steering to the right. This makes it easier for the driver to apply the countersteering, and thus ensures the stability of the vehicle.

As described above, the Embodiment 1 provides operation and advantages listed below.

(1) The vehicle control system includes:

Step S203 (relative slip angle computation unit) configured to compute the relative slip angle γ between the leading vehicle and the ego vehicle on the basis of the distance L between the ego vehicle and the leading vehicle and the distance D between the traveling-direction virtual line extending from the ego vehicle in the traveling direction and the leading vehicle;

Step S208 (spin judgment threshold setting unit) configured to set the spin judgment threshold values $γ_{upper}$ and $γ_{lower}$ according to the relative slip angle γ; and the spin suppression control processing (yaw moment control unit) configured to control the yaw moment to reduce the relative slip angle γ when the relative slip angle γ exceeds the spin judgment threshold value.

This makes it possible to recognize the spinning state even if the vehicle spins slowly. The yaw moment control can be therefore initiated reliably, which ensures the stability of vehicle behavior. Furthermore, since the relative slip angle is calculated according to the relationship with the leading vehicle, the spinning state can be judged according to a stable value, regardless of the shape of the travel-path defining line and the like.

The present embodiment performs the spinning state detection using the relative slip angle as shown in FIGS. 22 and 26 in a low speed area. However, it is also possible to perform the spinning state detection using the relative slip angle as shown in FIGS. 22 and 26, regardless of vehicle speed. Also, the spinning state detection using the relative slip angle as shown in FIGS. 22 and 26 may be combined with another spin detection method, such as spin detection based on an actual yaw rate value. For example, it is possible to perform the spin detection based on the actual yaw rate value in a high speed area and perform the spinning state detection using the relative slip angle as shown in FIGS. 22 and 26 in the low speed area.

(2) The vehicle control system includes the electrically-assisted power steering 2 (assist torque control unit) configured to apply a predetermined assist torque to a steering torque applied by the driver, wherein:

the electrically-assisted power steering 2 increases an assist torque acting to reduce the relative slip angle γ to be higher than a regular assist torque (predetermined assist torque) and reduces an assist torque acting to increase the relative slip angle γ to be lower than the regular assist torque (predetermined assist torque) when the spin flag is ON.

This makes it possible to allow the driver's steering operation and simultaneously guide the vehicle into such a steering condition that the vehicle more successfully travels along with motion of the leading vehicle, that is, parallel to the travel-path defining line. This ensures safety without giving the driver a feeling of strangeness. The Embodiment 1 is provided with the electrically-assisted power steering 2. If the vehicle is installed with a steer-by-wire system, however, it is also possible to control a steering reaction torque by controlling a reaction motor to guide the vehicle into a condition where the driver can apply countersteering without difficulty.

(3) When Step S208 computes the spin judgment threshold values, the values of adding or subtracting the predetermined value Δγ to or from the filter value γ(LPF) obtained by passing the relative slip angle γ through the low-pass filter LFP are set as the spin judgment threshold values $γ_{upper}$ and $γ_{lower}$. It is therefore possible with a simple configuration to set proper threshold values as a situation demands. The time constant of the low-pass filter may be optionally set in accordance with a road surface condition and travel environment.

(4) Steps S201 to S203 are configured to perform computation with the stereo camera 310 which measures the distance by using disparity created when the plurality of cameras 310a and 310b take an image of the same object.

This makes it possible to stereoscopically perceive distance and obstacles ahead of the vehicle. It is possible to detect, on the basis of image recognition, even the slow spinning state which is difficult to be detected by a sensor, such as a yaw rate sensor, which directly detects vehicle motions. This enables highly safe control.

Embodiment 2

Figure 27:
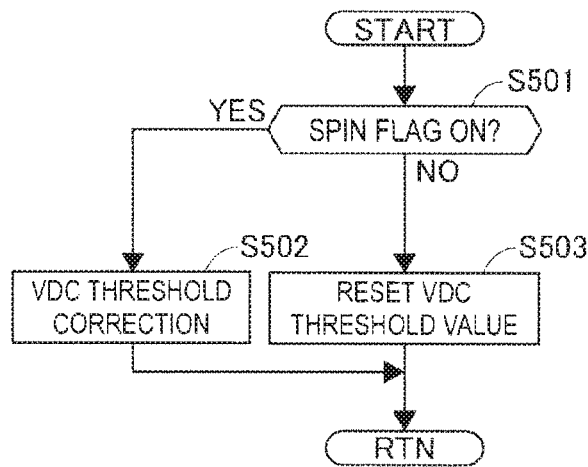
FIG. 27 is a flowchart showing processing for VDC control onset threshold correction on the basis of spin detection according to an Embodiment 2.

An Embodiment 2 will now be described. The Embodiment 2 has a similar basic configuration to the Embodiment 1, so that the following description refers to differences therebetween. During the vehicle-attitude stabilizing control in the low speed area, the Embodiment 1 executes the spin suppression control processing at the occurrence of spinning mainly by conducting the steering control which functions effectively, instead of conducting the yaw moment control by the brake control. The Embodiment 2 differs from the Embodiment 1 in that, besides the vehicle-attitude stabilizing control, the vehicle behavior control provided to the hydraulic brake unit 3 is conducted to carry out the spin suppression control at the occurrence of spinning. Although the description of the present embodiment refers to the case where the spinning state detection and the VDC control onset threshold correction processing using the relative slip angle as shown in FIGS. 22 and 27 are performed in the low speed area, the spinning state detection and the VDC control onset threshold correction processing using the relative slip angle as shown in FIGS. 22 and 27 may be performed, regardless of the vehicle speed. It is also possible to combine the spinning state detection using the relative slip angle as shown in FIGS. 22 and 27 and another spin detection method such as spin detection based on the actual yaw rate value. For example, it is possible to perform the spin detection based on the actual yaw rate value in the high speed area and perform the spinning state detection and the VDC control onset threshold correction processing using the relative slip angle as shown in FIGS. 22 and 27 in the low speed area.

The vehicle behavior control is a well-known technology called vehicle stability control or vehicle dynamics control (hereinafter, referred to as VDC). According to the vehicle behavior control, the target yaw rate is calculated from the vehicle speed and the steering angle. When deviation between an actual yaw rate detected by the vehicle motion detector 11 and the target yaw rate becomes equal to or larger than predetermined deviation, the yaw moment control is executed, which generates a braking torque in a target wheel so that the actual yaw rate is equal to the target yaw rate. This suppresses an oversteer or understeer state to a neutral steer state.

According to the VDC, in general, when the deviation between the actual yaw rate and the target yaw rate exceeds a control onset threshold value which is set at a certain value, the yaw moment control by the VDC is initiated to suppress the feeling of strangeness which is caused by continual noise or frequent activation of the brake device. If the vehicle spins slowly on the low µ road or the like at low speed, however, the vehicle motion detector 11 sometimes fails to detect the yaw rate. As the result, the deviation does not exceed the control onset threshold value, and the VDC cannot be initiated.

In this light, according to the Embodiment 2, if the relative slip angle between the leading vehicle and the ego vehicle is detected by the stereo camera 310, and the spinning state is detected through the stereo camera 310 according to changes of the relative slip angle while the VDC is not activated, the control onset threshold value of the VDC is corrected to a small value to actively activate the VDC, to thereby suppress the spinning state.

FIG. 27 is a flowchart showing the processing for the VDC control onset threshold correction on the basis of the spin detection according to the Embodiment 2.

In Step S501, the vehicle-attitude stabilizing control unit 21 makes a judgment as to whether the spin flag is ON. If the spin flag is judged to be ON, it is judged that spinning is occurring. The routine then proceeds to Step S502. Otherwise, the routine moves to Step S503.

In Step S502, the vehicle-attitude stabilizing control unit 21 corrects the VDC control onset threshold value to a small value.

In Step S503, the vehicle-attitude stabilizing control unit 21 resets the VDC control onset value to an initial value.

A judgment is made as to whether a yaw rate deviation is equal to or larger than the VDC control threshold value. If the yaw rate deviation is equal to or larger than the VDC control threshold value, the vehicle behavior control (VDC) provided to the hydraulic brake unit 3 is executed. As described above, the vehicle behavior control is executed apart from the vehicle-attitude stabilizing control such as the steering assist control (FIG. 26). In the vehicle behavior control (VDC) executed when the yaw rate deviation is equal to or larger than the VDC control threshold value, instead of the sensor value obtained by the vehicle motion detector 11, a yaw rate equivalent value may be calculated as a yaw rate from the formed angle θ recognized by the stereo camera 310, and then, a brake control amount may be calculated from the yaw rate equivalent value.

The description of the present embodiment refers to the case where when the spinning state is detected, the vehicle-attitude stabilizing control is carried out, and moreover, the vehicle behavior control (VDC) by the brake unit is executed. However, only the vehicle behavior control (VDC) by the brake unit may be carried out when the spinning state is detected.

As described above, the Embodiment 2 provides the following operation and advantages.

(5) The vehicle system includes the VDC (vehicle motion control unit) configured to carry out the yaw moment control by controlling the braking force of each wheel so that the actual yaw rate (vehicle motion state) is equal to the target yaw rate (target vehicle motion state) when the deviation between the actual yaw rate and the target yaw rate is equal to or larger than the control onset threshold value; and Step S502 (control onset threshold correction unit) configured to correct the control onset threshold value of the VDC to a smaller value when the relative slip angle γ exceeds the spin judgment threshold value as shown in Step S501.

Even if the vehicle spins slowly, therefore, the spinning state can be recognized. This enables active execution of the vehicle behavior control by the VDC and ensures the stability of vehicle behavior.

The present invention has been described on the basis of the embodiments. The invention does not necessarily have to be configured in the above-described manner, but may be optionally modified in configuration within the scope thereof. For example, the Embodiment 1 illustrates the case in which the yaw moment control by the brake control is not executed when the vehicle travels at low speed. It is possible, however, to execute the yaw moment control by the brake control during the low speed driving as well. In this case, the yaw rate equivalent value may be calculated as a yaw rate from the formed angle θ recognized by the stereo camera 310, instead of the sensor value obtained by the vehicle motion detector 11, and then, the brake control amount may be calculated from the yaw rate equivalent value.

The Embodiment 1 calculates the control amount H(t) when the evaluation function Ho(t) is larger than the predetermined value δ. If the spinning state is detected, however, the vehicle-behavior stabilizing control may be more actively carried out by correcting the predetermined value δ to a smaller value.

Since the spinning state can be recognized even if the vehicle spins slowly, the stability of vehicle behavior is ensured.

A vehicle control system according to one aspect of the invention includes a relative slip angle computation unit configured to compute a relative slip angle between a leading vehicle and an ego vehicle on the basis of distance between the ego vehicle and the leasing vehicle and distance between a traveling-direction virtual line extending from the ego vehicle in a traveling direction and the leading vehicle; a spin judgment threshold setting unit configured to set a spin judgment threshold value according to the relative slip angle; and a yaw moment control unit configured to control yaw moment to reduce the relative slip angle when the relative slip angle exceeds the spin judgment threshold value.

According to the vehicle control system, there may be provided an assist torque control unit configured to apply a predetermined assist torque to a steering torque applied by a driver, and the yaw moment control unit may control an assist torque acting to reduce the relative slip angle to be higher than the predetermined assist torque and control an assist torque acting to increase the relative slip angle to be lower than the predetermined assist torque when the relative slip angle exceeds the spin judgment threshold value.

According to the vehicle control system, there may be provided a vehicle motion control unit configured to carry out yaw moment control by controlling a braking force of each wheel so that a target yaw rate is achieved when deviation between a vehicle motion state and a target vehicle motion state is equal to or larger than a control onset threshold value, and the yaw moment control unit may include a control onset threshold correction unit configured to correct the control onset threshold value to a smaller value when the relative slip angle exceeds the spin judgment threshold value.

According to the vehicle control system, the spin judgment threshold setting unit may set, as a spin judgment threshold value, a value of adding or subtracting a predetermined value to or from a filter value obtained by passing the relative slip angle through the low-pass filter.

According to the vehicle control system, the relative slip angle computation unit may include a stereo camera configured to measure distance by using disparity created when a plurality of cameras take an image of the same object.

The vehicle control system may calculate distance between the ego vehicle and the leading vehicle and compute the relative slip angle on the basis of the leading vehicle, the calculated distance to which is shorter than predetermined distance.

A vehicle control system according to one aspect of the invention includes a camera configured to recognize relative relationship between an ego vehicle and a leading vehicle; a relative slip angle computation unit configured to compute a relative slip angle between the leading vehicle and the ego vehicle from the recognized relative relationship between the ego vehicle and the leading vehicle; and a yaw moment control unit configured to control yaw moment to reduce the relative slip angle when the relative slip angle exceeds a spin judgment threshold value which is set according to the relative slip angle.

According to the vehicle control system, the camera may include a stereo camera configured to measure distance by using disparity created when a plurality of cameras take an image of the same object.

According to the vehicle control system, the relative slip angle computation unit may compute the relative slip angle between the leading vehicle and the ego vehicle on the basis of distance between the ego vehicle and the leading vehicle and distance between the traveling-direction virtual line extending from the ego vehicle in the traveling direction and the leading vehicle.

According to the vehicle control system, there may be provided an assist torque control unit configured to apply a predetermined assist torque to a steering torque applied by a driver, and the yaw moment control unit may control an assist torque acting to reduce the relative slip angle to be higher than the predetermined assist torque and control an assist torque acting to increase the relative slip angle to be lower than the predetermined assist torque.

According to the vehicle control system, there may be provided a vehicle motion control unit configured to carry out yaw moment control by controlling a braking force of each wheel so that a target yaw rate is achieved when deviation between a vehicle motion state and a target vehicle motion state is equal to or larger than a control onset threshold value, and the yaw moment control unit may include a control onset threshold correction unit configured to correct the control onset threshold value to a smaller value when the relative slip angle exceeds the spin judgment threshold value.

According to the vehicle control system, the distance between the ego vehicle and the leading vehicle is calculated, and the relative slip angle is computed on the basis of the leading vehicle, the calculated distance to which is shorter than predetermined distance.

According to the vehicle control system, there may be provided a spin judgment threshold setting unit configured to set the spin judgment threshold value, and the spin judgment threshold setting unit may set, as a spin judgment threshold value, a value of adding or subtracting a predetermined value to or from a filter value obtained by passing the relative slip angle through a low-pass filter.

A vehicle control system according to one aspect of the invention includes a relative slip angle computation unit configured to compute a relative slip angle between a leading vehicle and an ego vehicle on the basis of distance between the ego vehicle and the leading vehicle and distance between a traveling-direction virtual line extending from the ego vehicle in a traveling direction and the leading vehicle; a spin judgment threshold setting unit configured to set a spin judgment threshold value according to the relative slip angle; a steering actuator configured to control a steering torque applied by a driver; and a yaw moment control unit configured to control yaw moment to reduce the relative slip angle when the relative slip angle exceeds the spin judgment threshold value, and the yaw moment control unit is configured to carry out yaw moment control by automatically controlling the steering actuator.

According to the vehicle control system, there may be provided an assist torque control unit configured to use the steering actuator to apply a predetermined assist torque to a steering torque applied by a driver, and the yaw moment control unit may control an assist torque acting to reduce the relative slip angle to be higher than the predetermined assist torque and control an assist torque acting to increase the relative slip angle to be lower than the predetermined assist torque when the relative slip angle exceeds the spin judgment threshold value.

According to the vehicle control system, the yaw moment control unit may further be configured to carry out yaw moment control by brake control which applies a braking torque to wheels.

According to the vehicle control system, the brake control may be executed by a vehicle motion control unit which carries out the yaw moment control by controlling a braking force of each wheel so that a target yaw rate is achieved when deviation between a vehicle motion state and a target vehicle motion state is equal to or larger than a control onset threshold value, and the yaw moment control unit may include a control onset threshold correction unit configured to correct the control onset threshold value to be a smaller value when the relative slip angle exceeds the spin judgment threshold value.

The foregoing description merely explains several embodiments of the invention. Those skilled in the art could easily understand that the embodiments described above may be changed or modified in various ways without substantially deviating from new teachings and advantages of the invention. Therefore, it is intended to include within the technological scope of the invention all aspects added with such changes or modifications.

The present patent application claims priority to Japanese Patent Application No. 2013-126114 filed on Jun. 14, 2013. The entire disclosure of Japanese Patent Application No. 2013-126114 filed on Jun. 14, 2013 including description, claims, drawings and abstract is incorporated herein by reference in its entirety.

The entire disclosure of Japanese Unexamined Patent Application Publication No. 2004-345460 (Patent Document 1) including description, claims, drawings and abstract is incorporated herein by reference in its entirety.

REFERENCE SIGNS LIST 1 travel environment recognition system
2 electrically-assisted power steering
3 hydraulic brake unit
4 brake booster
5 steering wheel
10 electronic control unit
11 vehicle motion detector
20 departure-tendency calculating unit
21 vehicle-attitude stabilizing control unit
22 travel-path defining line recognition unit
24 intersect time calculation unit
25 virtual travel-path defining line calculation unit
26 activation necessity judgment unit
310 stereo camera

The invention claimed is:

1. A vehicle control system comprising:
an electronic control unit configured to
compute a relative slip angle between a leading vehicle and an ego vehicle on the basis of distance between the ego vehicle and the leading vehicle and distance between a traveling-direction virtual line extending from the ego vehicle in a traveling direction and the leading vehicle;
determine a delayed relative slip angle which has a predetermined delay from the relative slip angle; and
set a spin judgment threshold value according to the delayed relative slip angle; and
control yaw moment to reduce the relative slip angle when the relative slip angle exceeds the spin judgment threshold value.

2. The vehicle control system of claim 1, wherein the electronic control unit is further configured to:
apply a predetermined assist torque to a steering torque applied by a driver, and
control an assist torque to be higher or lower than the predetermined assist torque when the relative slip angle exceeds the spin judgment threshold value.

3. The vehicle control system of claim 1, wherein the electronic control unit is further configured to:
carry out yaw moment control by controlling a braking force of each wheel so that a target yaw rate is achieved when deviation between a vehicle motion state and a target vehicle motion state is equal to or larger than a control onset threshold value, and
correct the control onset threshold value to a smaller value when the relative slip angle exceeds the spin judgment threshold value.

4. The vehicle control system of claim 1, wherein:
the electronic control unit is configured to set, as a spin judgment threshold value, a value of adding or subtracting a predetermined value to or from a filter value obtained by passing the relative slip angle through a low-pass filter.

5. The vehicle control system of claim 1, further comprising:
a stereo camera configured to measure distance by using disparity created when a plurality of cameras take an image of the same object.

6. The vehicle control system of claim 1, wherein:
the electronic control unit is configured to calculate the distance between the ego vehicle and the leading vehicle and to compute the relative slip angle on the basis of the leading vehicle, the calculated distance to which is shorter than a predetermined distance.

7. A vehicle control system comprising:
a camera configured to recognize a relative relationship between an ego vehicle and a leading vehicle;
an electronic control unit configured to
compute a relative slip angle between the leading vehicle and the ego vehicle from the recognized relative relationship between the ego vehicle and the leading vehicle; and
control yaw moment to reduce the relative slip angle when the relative slip angle exceeds a spin judgment threshold value which is set according to a delayed relative slip angle which is determined by the electronic control unit and which has a predetermined delay from the relative slip angle.

8. The vehicle control system of claim 7, wherein:
the camera includes a stereo camera configured to measure distance by using disparity created when a plurality of cameras take an image of the same object.

9. The vehicle control system of claim 8, wherein:
the electronic control unit is configured to compute the relative slip angle between the leading vehicle and the ego vehicle on the basis of distance between the ego vehicle and the leading vehicle and distance between a traveling-direction virtual line extending from the ego vehicle in a traveling direction and the leading vehicle.

10. The vehicle control system of claim 9, wherein the electronic control unit is configured to:

apply a predetermined assist torque to a steering torque applied by a driver, and control an assist torque to be higher or lower than the predetermined assist torque when the relative slip angle exceeds the spin judgment threshold value.

11. The vehicle control system of claim 9, wherein the electronic control unit is configured to:

carry out yaw moment control by controlling a braking force of each wheel so that a target yaw rate is achieved when deviation between a vehicle motion state and a target vehicle motion state is equal to or larger than a control onset threshold value, and correct the control threshold value to a smaller value when the relative slip angle exceeds the spin judgment threshold value.

12. The vehicle control system of claim 9, wherein:

the electronic control unit is configured to calculate the distance between the ego vehicle and the leading vehicle, and compute the relative slip angle on the basis of the leading vehicle, the calculated distance to which is shorter than a predetermined distance.

13. The vehicle control system of claim 9, wherein the electronic control unit is configured to:

set the spin judgment threshold value, and set, as a spin judgment threshold value, a value of adding or subtracting a predetermined value to or from a filter value obtained by passing the relative slip angle through a low-pass filter.

14. A vehicle control system comprising:

an electronic control unit configured to compute a relative slip angle between a leading vehicle and an ego vehicle on the basis of distance between the ego vehicle and the leading vehicle and distance between a traveling-direction virtual line extending from the ego vehicle in a traveling direction and the leading vehicle;

set a spin judgment threshold value according to the relative slip angle;

control a steering torque applied by a driver;

control yaw moment to reduce the relative slip angle when the relative slip angle exceeds the spin judgment threshold value which is set according to a delayed relative slip angle determined by the electronic control unit and which has a predetermined delay from the relative slip angle, and carry out yaw moment control automatically.

15. The vehicle control system of claim 14, wherein the electronic control unit is configured to:

apply a predetermined assist torque to a steering torque applied by a driver, and control an assist torque to be higher or lower than the predetermined assist torque when the relative slip angle exceeds the spin judgment threshold value.

16. The vehicle control system of claim 14, wherein:

the electronic control unit is configured to further carry out yaw moment control by a brake control which applies a braking torque to wheels.

17. The vehicle control system of claim 16, wherein the electronic control unit is configured to:

carry out the yaw moment control by controlling a braking force of each wheel so that a target yaw rate is achieved when deviation between a vehicle motion state and a target vehicle motion state is equal to or larger than a control onset threshold value, and correct the control onset threshold value to a smaller value when the relative slip angle exceeds the spin judgment threshold value.

* * * * *